US006794776B1

(12) United States Patent
Gabrys

(10) Patent No.: US 6,794,776 B1
(45) Date of Patent: Sep. 21, 2004

(54) INDUCTOR ALTERNATOR FLYWHEEL SYSTEM

(76) Inventor: Christopher W Gabrys, 900 S. Meadows Pkwy #3513, Reno, NV (US) 89511

( * ) Notice: Subject to any disclaimer, the term of this patent is extended or adjusted under 35 U.S.C. 154(b) by 36 days.

(21) Appl. No.: 09/977,678

(22) Filed: Oct. 15, 2001

(51) Int. Cl.[7] .................................................. H02K 7/02
(52) U.S. Cl. ....................... 310/74; 310/209; 310/90.5
(58) Field of Search .......................... 310/74, 177–180, 310/209, 266, 90.5, 191; 322/4, 13–16

(56) References Cited

U.S. PATENT DOCUMENTS

| 3,866,442 | A | * | 2/1975 | Kouril et al. ................. 66/232 |
|---|---|---|---|---|
| 4,211,452 | A | * | 7/1980 | Poubeau ..................... 310/90.5 |
| 4,563,046 | A | * | 1/1986 | Shimamoto ................. 310/90.5 |
| 4,652,780 | A | * | 3/1987 | Murakami et al. .......... 310/90.5 |
| 5,065,060 | A | * | 11/1991 | Takahashi et al. ............ 310/74 |
| 5,418,415 | A | | 5/1995 | Ishizaki ....................... 310/162 |
| 5,640,887 | A | * | 6/1997 | Hull et al. ..................... 74/572 |
| 5,646,458 | A | * | 7/1997 | Bowyer et al. ............... 307/67 |
| 5,703,421 | A | | 12/1997 | Durkin ........................ 310/61 |
| 5,731,645 | A | | 3/1998 | Clifton et al. ................ 310/74 |
| 5,767,601 | A | * | 6/1998 | Uchiyama .................... 310/190 |
| 5,905,321 | A | | 5/1999 | Clifton et al. ............... 310/178 |
| 5,929,548 | A | | 7/1999 | Pinkerton et al. ............ 370/166 |
| 5,932,935 | A | | 8/1999 | Clifton et al. ................ 307/60 |
| 5,955,816 | A | | 9/1999 | Clifton et al. ............... 310/261 |
| 6,029,538 | A | | 2/2000 | Little et al. ................... 74/572 |
| 6,111,390 | A | * | 8/2000 | Inaba et al. .................. 322/28 |
| 6,166,472 | A | | 12/2000 | Pinkerton et al. ........... 310/208 |
| 6,172,435 | B1 | * | 1/2001 | Tanaka ........................ 310/74 |

* cited by examiner

*Primary Examiner*—Dang Le
(74) *Attorney, Agent, or Firm*—J. Michael Neary

(57) ABSTRACT

An inductor alternator flywheel system, for converting between electrical and kinetic energy, includes an annular steel flywheel mounted on bearings for rotation about an axis. The flywheel has an inwardly facing radial surface forming multiple protrusions or teeth extending radially inwardly. A yoke has a field coil for producing homopolar flux which creates magnetic poles in the teeth. A cylinder constructed of substantially high permeability material, and having an outer radial surface, is mounted concentrically in the bore of the annular flywheel and is spaced apart radially from the teeth such that an armature air gap is formed between the teeth and the outer surface of the cylinder. A ring of armature coils is mounted within the air gap such that the flux induces an alternating voltage in the armature coils when the rotor rotates about its axis. A field controller provides field power at a level to the field coil when the flywheel is rotating at normal fill operating speed such that the generator provides full output power under full load to the output at the instant of disruption in primary power. The field controller increases the field power during a continuous disruption of primary power to maintain a substantially constant output voltage at the output as the generator speed decreases.

38 Claims, 19 Drawing Sheets

INDUCTOR ALTERNATOR FLYWHEEL SYSTEM

This invention pertains to flywheel energy storage systems and more particularly to an improved inductor alternator flywheel system that eliminates power disruptions, has increased efficiency, and is more compact than previous devices. The higher efficiency of the invention allows its proficient operation with an activated field power, thus eliminating short-term interruptions of power occurring with prior systems and also potentially for allowing higher speed and higher power operation.

BACKGROUND OF THE INVENTION

Flywheel energy storage systems are being employed for supplying power to a protected load during interruptions of power from the grid. Flywheel systems use a large inertia flywheel that is supported by a bearing system and is coupled to a motor/generator. The motor/generator converts between electrical and mechanical energy by accelerating the flywheel for storing energy and decelerating the flywheel for retrieving energy. The flywheel is typically housed in a low-pressure container to limit losses from aerodynamic drag. Such systems are very advantageous for supplying back-up power to communications networks during power outages, and can also be used as ride-through devices that supply power during the start-up period that an auxiliary power source, such as a generator, needs before it can come on-line. Flywheels offer very high power capability and increased reliability over conventional electrochemical batteries, and also have longer lifespans.

To date, various types of flywheel systems have been proposed, each having different goals and attributes for their different applications. One type of flywheel system that is currently being utilized employs an inductor alternator for the motor/generator. In general, alternators use field coils that create a magnetic field which can be varied by controlling power to the field coil, and thereby control the output voltage that is generated from rotation of an armature in the magnetic field. This control can be used to maintain a relatively constant desired output voltage for a flywheel system as the speed of the flywheel slows. In contrast, conventional permanent magnet generators suffer from an output voltage that decreases linearly with speed, necessitating the use of output power conversion electronics to maintain the desired constant output voltage. For very high power systems, the cost of power electronics increases substantially, thus making an alternator flywheel system desirable.

Inductor alternators are a type of alternator particularly well suited for flywheel and other high speed applications since they have both the field and armature coils stationary. This eliminates the need to reinforce coils for high-speed rotation and also the need for electrical contact with the rotating flywheel that would require brushes that wear. Inductor alternators generate power by inducing a voltage in the armature windings from periodic changes in the magnetic flux that links the armature coils. Current in the field windings sets up the flux, and changes in the flux through the armature windings are the result of changes in the reluctance of the magnetic circuit. The rotor of the inductor alternator causes these changes by rotation of teeth or poles in an air gap in the magnetic circuit, thereby increasing and decreasing the air gap as the teeth or poles pass through it. The rotor of an inductor alternator can thus be made very simply as a gear and as such is well suited for high-speed rotation When the rotor of an inductor alternator is combined into a flywheel, the resulting device can be well suited for both storing energy and for delivering a high power constant output voltage.

One such inductor alternator flywheel system of the prior art is shown in FIG. 1. The flywheel system 30 is comprised of a solid steel flywheel rotor 31 that rotates inside a shell 40. The flywheel 31 has integral shafts 36 that journal the rotor inside upper and lower mechanical bearings 37 and 38. The flywheel rotor 31 stores the kinetic energy and also serves as an inductor alternator rotor by having an outer surface defined by poles 32, each having a radius 34, separated by recesses 33 with radii 35. A stationary field coil 39 generates flux, which flows axially into the flywheel 31, then radially outward through the poles 32 and through armature coils 43. A laminated ring 42 diffuses changes in the flux created from rotation of the flywheel poles 32. The outer shell 40 that contains the vacuum also serves as a path for the flux to connect back to the field coil 39 and complete the magnetic circuit.

Although this type of inductor alternator flywheel system is relatively simple and is capable of supplying high levels of power, this system has several significant drawbacks. The system has power losses that generate heat during standby operation while rotating at full speed with no loss of primary power. To alleviate these losses, the power to the field coil is kept reduced when in standby mode. This reduces the flux through the rotor and its poles and the armature coils. In standby operation and also when the flywheel is accelerating, the armature coils are energized by synchronized multiphase power (typically 3 phase), to make the inductor alternator function as a motor. Energizing of a set of coils causes the rotor to rotate such that its poles or teeth tend to line up with the energized coils and when they do, the sequentially next coils are energized to propel it around. In the process, the energizing of armature coils and the rotation of rotor poles into a changing magnetic field, the magnetic flux through the rotor poles continuously changes. Changes in flux through any conductor, such as the steel rotor, cause generation of eddy currents. The large teeth allow a very big area for generation of large eddy currents. The greater the currents, the greater the loss and heat created. Losses also occur from the changing flux in the rotor due to magnetic hysteresis. Losses for the system shown in FIG. 1 during standby operation are approximately 2 kilowatts. If the field coil is fully energized and the system is discharging, losses can expectedly be much higher. Removal of large amounts of continuous heat requires fans and periodic maintenance for cleaning air filters. More importantly, current systems operate at low tip speeds, stress levels and energy storage capability. The radial and hoop direction stresses for a 25 inch diameter flywheel rotating at 7000 rpm are shown in FIGS. 2A and 2B. As can be seen, the stress levels at this operating speed are low and the energy storage per the size of flywheel is low. If such flywheel inductor alternators were rotated to higher speeds to increase the energy storage density, the eddy current losses would increase with the square of the speed.

In addition to these high losses and low storage issues, another problem with the system shown in FIG. 1 operating in stand-by mode with reduced power to the field coil is that there is a time lag before it can provide full power in the event of a power interruption. A monitoring system is used to monitor the primary power. When it senses an interruption of primary power, it sends a drive signal to the field coil in the flywheel storage unit that causes the field coil current to ramp up such that required output power is provided. Some amount of time is required between sensing the loss of power and increasing the field coil power to raise the output of the system to full power. For some critical applications such as in telecommunications, computers and semiconductor manufacturing, loss of power for even fractions of a second may be costly.

One well-known method for reducing losses in motor/generators and other magnetic circuit devices is to fabricate the magnetic path with laminated construction. The laminated construction builds the structure by stacking multiple layers of the magnetic circuit material together, each layer being electrically insulated from adjacent layers through use of insulative coatings. This construction reduces eddy current losses because eddy currents generated are limited in size to flow only in the thickness on the individual lamination layers. Loss reduction in motor/generators is also helped by specially selection the material of the magnetic path and its heat treatment. The material and condition are usually made to increase the magnetic permeability of the material, decrease its electrical conductivity and to reduce hysteresis losses. These steels typically have very low carbon contents. Different types of lamination or electrical steels can be selected based on the application, acceptable losses and acceptable costs. Silicon steels are very commonly used because the added silicon decreases the volume resistivity for further reduction of eddy current losses. Nickel alloys containing between 49% to 80% nickel with the remainder being nearly pure iron are used because of their very high permeability at low inductions and very low core losses. However, these alloys are very expensive. All types of lamination steels can be used to reduce the losses in inductor alternators. Unfortunately, lamination steels and their preferred heat treat condition for achieving high efficiency are not optimal for high speed operation with high stress levels. The strength of steels is directly related to its hardness condition. The maximum hardness that can be achieved with a given steel is directly related to the amount of carbon in the steel. These steels purposely have very low to almost no carbon in them. Further reducing the strength of these materials is the choice of heat treat condition for low losses. Lamination steels are used in the annealed condition. Annealing of steels results in the lowest possible strength. This is the opposite of quenching and tempering heat treatment preferably used to develop high strength for a high speed, highly stressed flywheel.

A high speed reluctance generator with a laminated rotor and stator of prior art is shown in FIG. 3. The reluctance motor/generator 50 is comprised of a rotor 53 that is fabricated from multiple axially stacked laminations 55, attached to a central shaft 56. A laminated stator 52, which also has poles 54, surrounds the rotor 53. The radial distance between the rotor 53 and stator 52 defines an air gap 57 of the machine. This use of the laminations allows for operation to very high rotational speeds, contemplated up to 100,000 rpm. The laminations reduce the losses such that a high frequency magnetic field from such high rotational speeds can be achieved. Although, the laminations in this rotor allow high rotational speeds, the rotor is not known to be capable of achieving high peripheral speeds. The diameter of the rotor would be limited by its ability to carry stress. A rotor of this construction having a large diameter and being rotated to high speeds would also pose difficulties in maintaining connectivity between the laminations and the central shaft. The stresses in a motor/generator rotor are proportional to the square of the peripheral speed, so if the diameter can be made small, the stresses can be kept low. For an energy storage flywheel, the goals are opposite: the peripheral speed is preferably made large for effectively storing a large amount of energy with the rotor.

SUMMARY OF THE INVENTION

The invention provides an inductor alternator flywheel system that has increased efficiency and is more compact than previous devices. The higher efficiency enables the system to operate with fully activated field power, allowing it to supply power without interuption in the event of a power failure in the grid. The higher efficiency also provides the potential for the system to operate at higher speed and higher power. The inductor alternator flywheel system uses a hollow steel cylindrical flywheel with the inductor alternator in the center. The bore of the hollow cylinder contains inwardly projecting teeth or castellations, which serve as the poles of the inductor alternator. A central cylinder, preferably having at least a partially laminated construction, cooperates with the rotor bore to form the stator. Armature coils are located radially between the central cylinder and rotor bore. At least one separate field coil provides the flux for alternator operation. The construction allows current to this field coil to be kept fully energized when the flywheel is rotating, even in standby operation. The flywheel is accelerated to full speed and kept at that speed by regulating the power from a synchronous inverter that drives the armature coils. During an interruption of primary power, the flywheel system instantly supplies full load power to the output without the time delay that occurs in prior art systems while the low stand-by current in a field coil is increased to establish the fill field flux necessary to generate fill power. As the speed is reduced from energy being extracted, the power to the field coil is further increased to maintain a constant output voltage until most of the energy is extracted.

Building a steel flywheel with a central hole causes the hoop direction stress to increase by a factor of two or greater. Metal flywheels that are constructed to be solid, without a central hole, have the lowest internal stress and can be operated at the highest rotational speed. Nevertheless, use of a hollow center in this invention is preferable, as will be shown. Prior inductor alternator flywheel systems are operated at relatively low stress levels; it is the system efficiency, and not the flywheel integrity, that is the main factor limiting performance. Placing the inductor alternator inside the bore allows a larger majority of the flywheel mass to be located at a large diameter, thereby maximizing the inertia per size and weight of the flywheel. With the inductor alternator integrated in the center, the system is also made more compact.

Further adding to the benefits of the invention, the construction provides the potential for maximizing efficiency. Because the flywheel is made as a hollow cylinder, the inductor alternator and flywheel energy storage functions can be partially separated such that their performances can be improved independently. The inductor alternator rotor with inwardly projecting poles can be made as a liner that is inserted into the bore of the flywheel rim, so the flywheel rim can be made from a high strength steel and heat treated to a high hardness while the liner is made from a lower magnetic loss material that has lower strength. The flywheel rim can be used to reinforce the liner for high speed rotation and the liner allows the inductor alternator to efficiently operate at high speeds. The liner can be interference fit into the bore of the flywheel rim by shrink fitting or press fitting which drives the liner initially into compression. During high-speed rotation, the stresses in the liner are thus kept low and acceptable for the liner material. Although the flywheel rim outside the liner may be used as part of the magnetic circuit, the flux through the rim is nearly uniform after passing through the liner and hence does not induce significant eddy currents that would be induced by a fluctuating magnetic flux, so losses are minimized.

In one embodiment of the invention, the liner is contrasted from multiple axially stacked layers that reduce the eddy currents in the pole teeth. The layers of the liner can be constructed of steel and separated by layers of electrically insulating material. For the lowest magnetic losses, the axial layers of the liner are constructed of very thin layers, preferably laminated steel. The thin laminations are electrically insulated by oxidizing or coating with enamel type coatings prior to stacking. The thinner the laminations for a given liner material, the lower the losses in the flywheel system but a balance must be made based on the costs.

In yet another embodiment of the invention, the hoop stress in the liner is further reduced to near zero stress by fabrication the liner from multiple individual segments about its circumference. This precludes the development of hoop stresses in the liner and can also reduce the cost of the liner. Instead of having to stamp rings where the center material is wasted, better material usage can be achieved by stamping the liner elements as arc segments.

The flywheel/inductor alternator rotor can be supported for rotation in the flywheel system by several different methods. One method involves connecting smaller diameter bearings in a hub that is mounted in the bore of the flywheel rim, and supporting those bearings on a central fixed shaft. To prevent shorting out the flux from the field coil through the hubs, they are preferably constructed from a non-ferromagnetic material such as aluminum or they contain a section of high reluctance for the field flux. The hubs can be interference assembled with the rim, or use sliding or bending joints to maintain connection with the rim at high speed. The inductor alternator flywheel system can employ upper and lower field coils or alternatively only one field coil can be used. In one version of the invention, the weight of the flywheel rotor is born by permanent magnets attached to the rotor that are in repulsion with stationary permanent magnets. Another version uses a central hub, which divides the rotor in two sections along its axial length. Upper and lower armature coils are employed, creating an upper and lower inductor alternator. In another version of the invention, the center cylinder is attached to the flywheel and rotates with it, also serving as the shaft for journaling between upper and lower bearings. The shaft is again attached to the flywheel rim using a high reluctance hub.

In one configuration of the invention the flywheel rotor is supported using full levitation magnetic bearings. The flywheel is supported radially by upper and lower radial magnetic bearings. A separate axial magnetic bearing can be used lift the flywheel weight. However in one embodiment of the invention, and this embodiment could be used with other types of inductor alternator flywheel systems, the field coil or coils are used to provide the active axial magnetic bearing in a fully levitated system. Although prior art systems used the field coils to reduce the weight of the flywheel that is carried by mechanical bearings, these systems used load force to provide feedback or were set as a constant lift force by supplying a constant current. For a fully levitated flywheel rotor, a constant current does not create a dynamically stable system. An axial position sensor is preferably used to sense the rotors position and to provide feedback for axial levitation. Because the field coil in an inductor alternator system is preferably wound to be very large and have a large inductance so that a high field can be created with low power consumption, the response time of the coil is very slow. The response time was not important for systems that only removed a portion of the load because the rotor position was essentially fixed and not dynamically unstable. However, for a fully levitated rotor, controlling the current to the field coils to achieve axial levitation would be extremely difficult if not impossible. The field coils do set up large axial direction fluxes that generate enough force to levitate the flywheel. The invention allows for these field coils to provide levitation force by replacing a single field coil with two coils. One coil is very large and it provides the flux for the inductor alternator operation. This flux is used as a bias flux for the magnetic bearing. The second coil is smaller, with a much lower inductance and faster response time, and it is used to provide the axial position control using feedback from the axial position sensor. The control force from the smaller coil is amplified by having the bias flux since the force is proportional to the square of the flux density.

DESCRIPTION OF THE DRAWINGS

The invention and its many attendant benefits and advantages will become better understood upon reading the following description of the preferred embodiments in conjunction with the following drawings, wherein.

Figure 14:
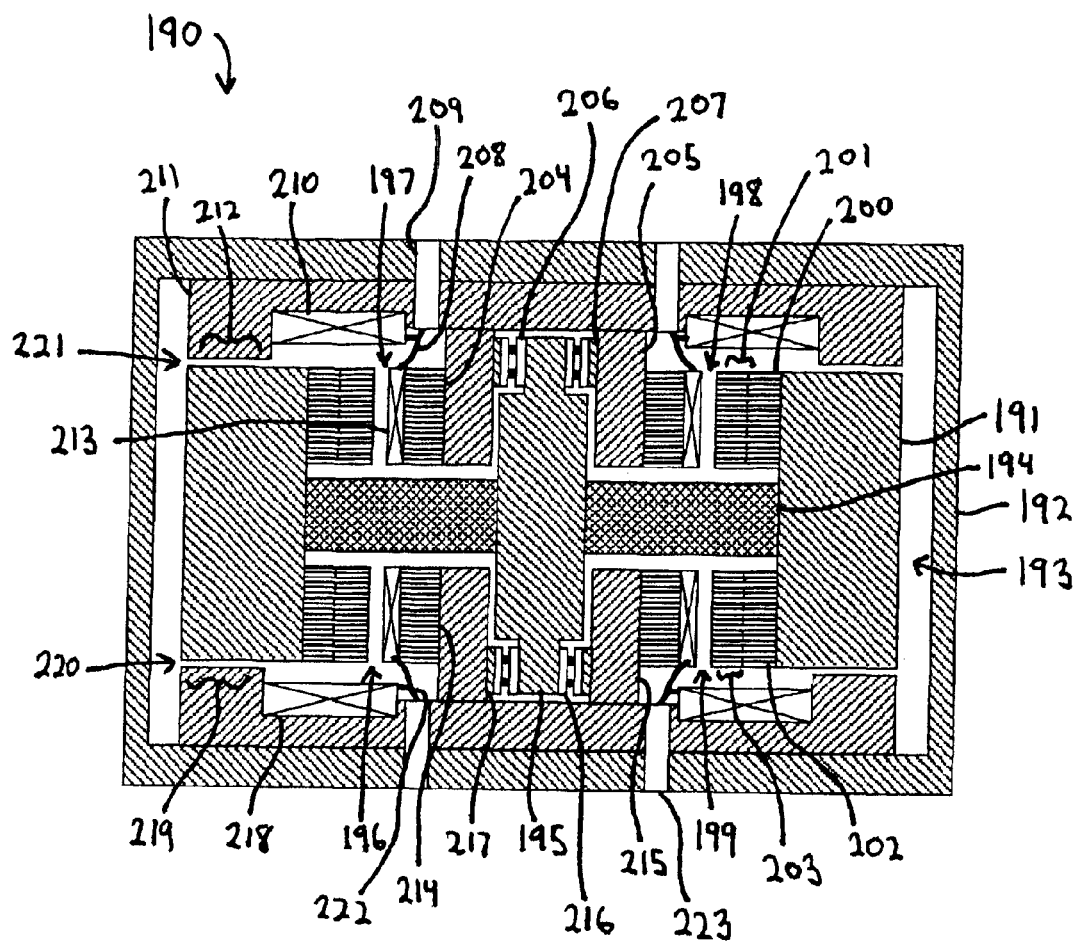

As FIG. 14 is a schematic drawing of another inductor alternator flywheel system in accordance with the invention.

Figure 15:
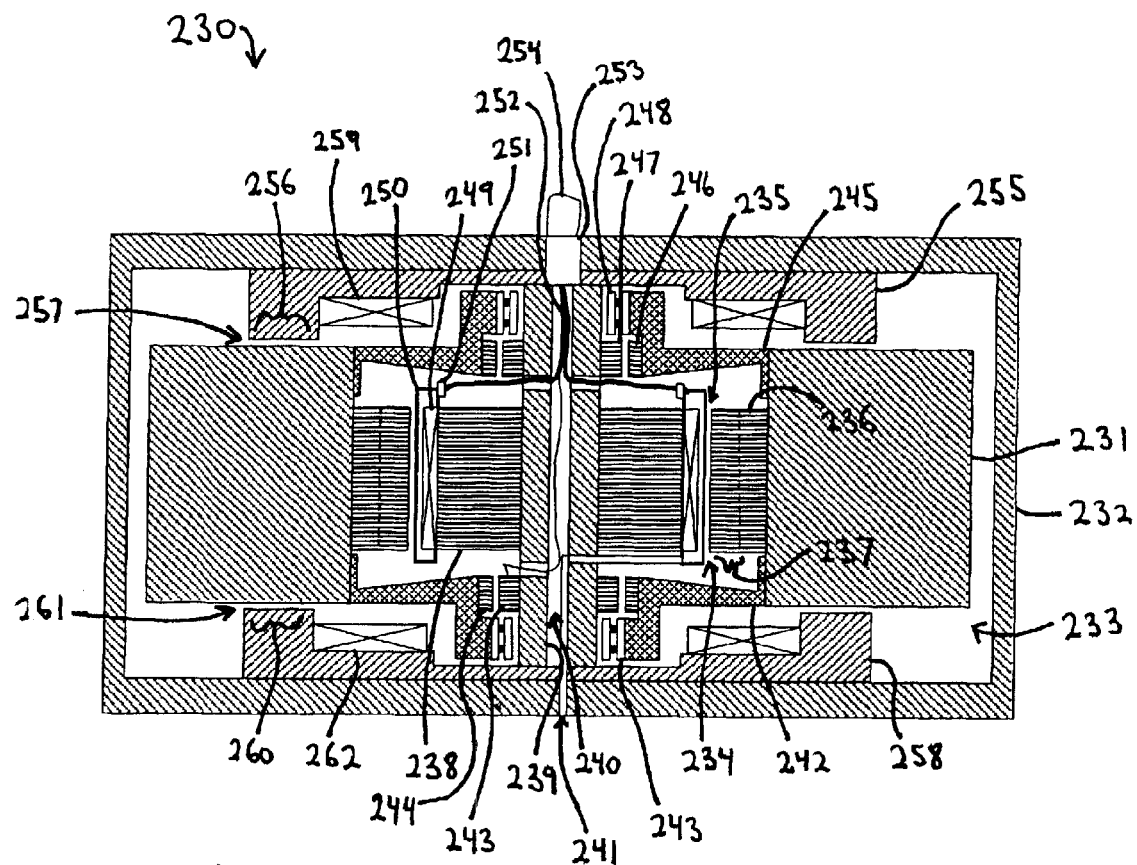

FIG. 15 is a schematic drawing of another inductor alternator flywheel system in accordance with the invention.

Figure 16:
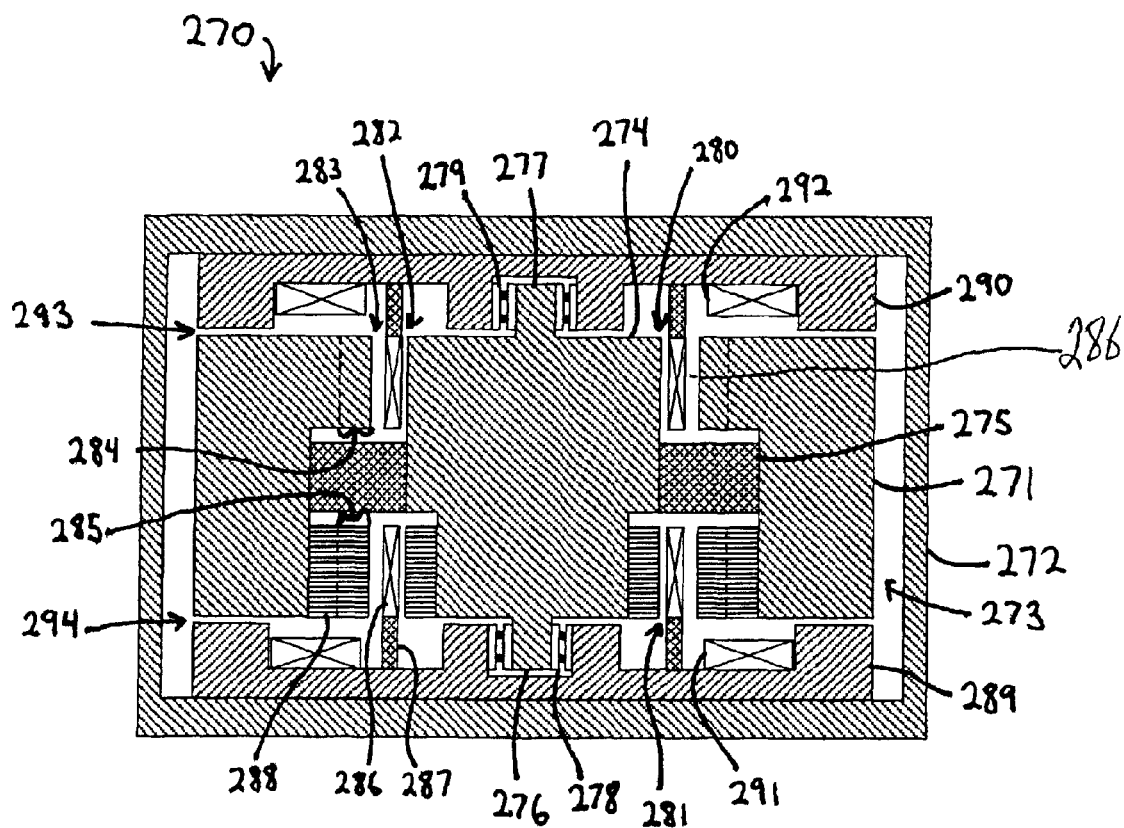
Figure 17:
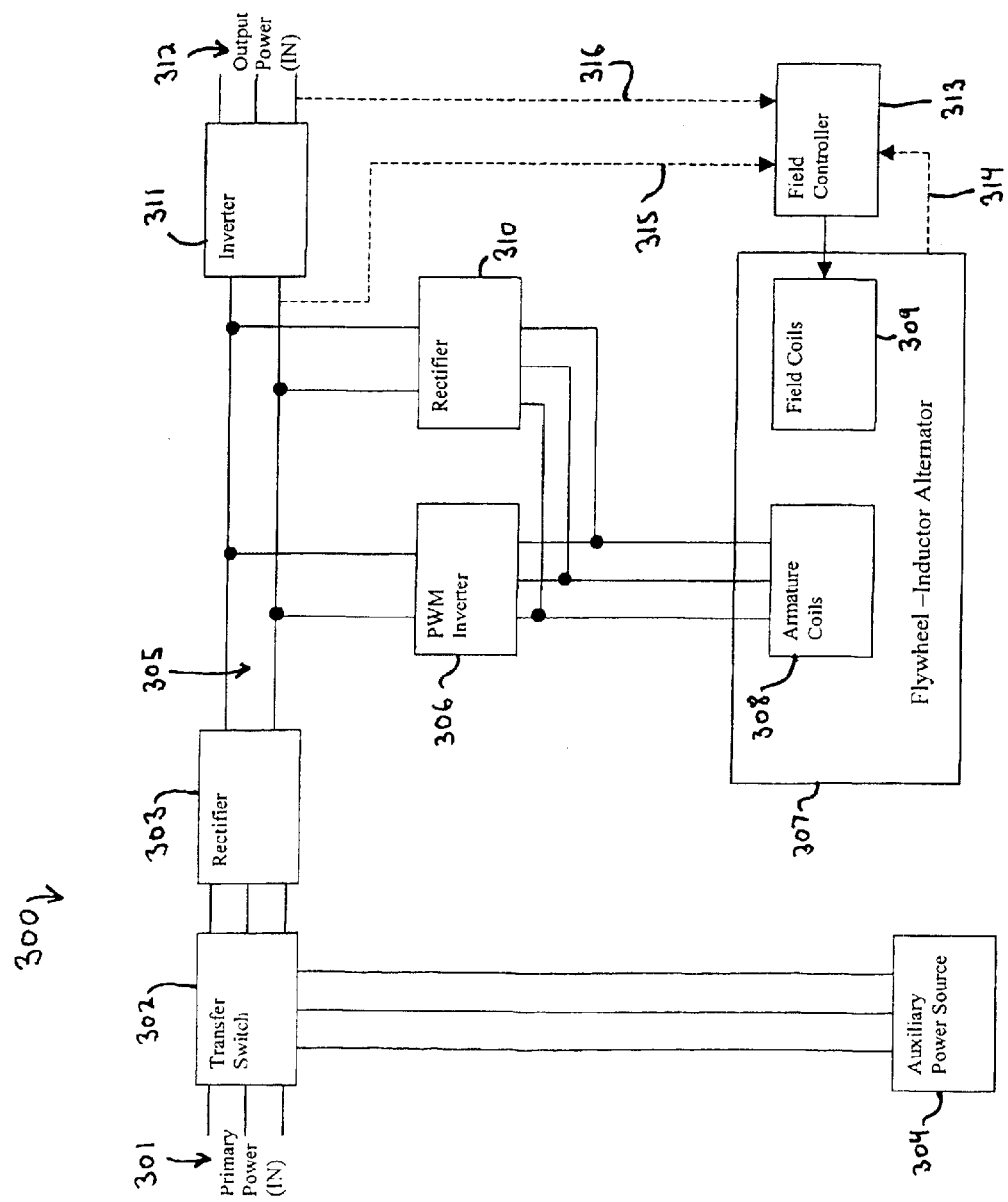

FIG. 16 is a schematic drawing of another inductor alternator flywheel system in accordance with the invention FIG. 17 is a schematic circuit diagram of an interruptible power source in accordance with the invention.

Figure 18:
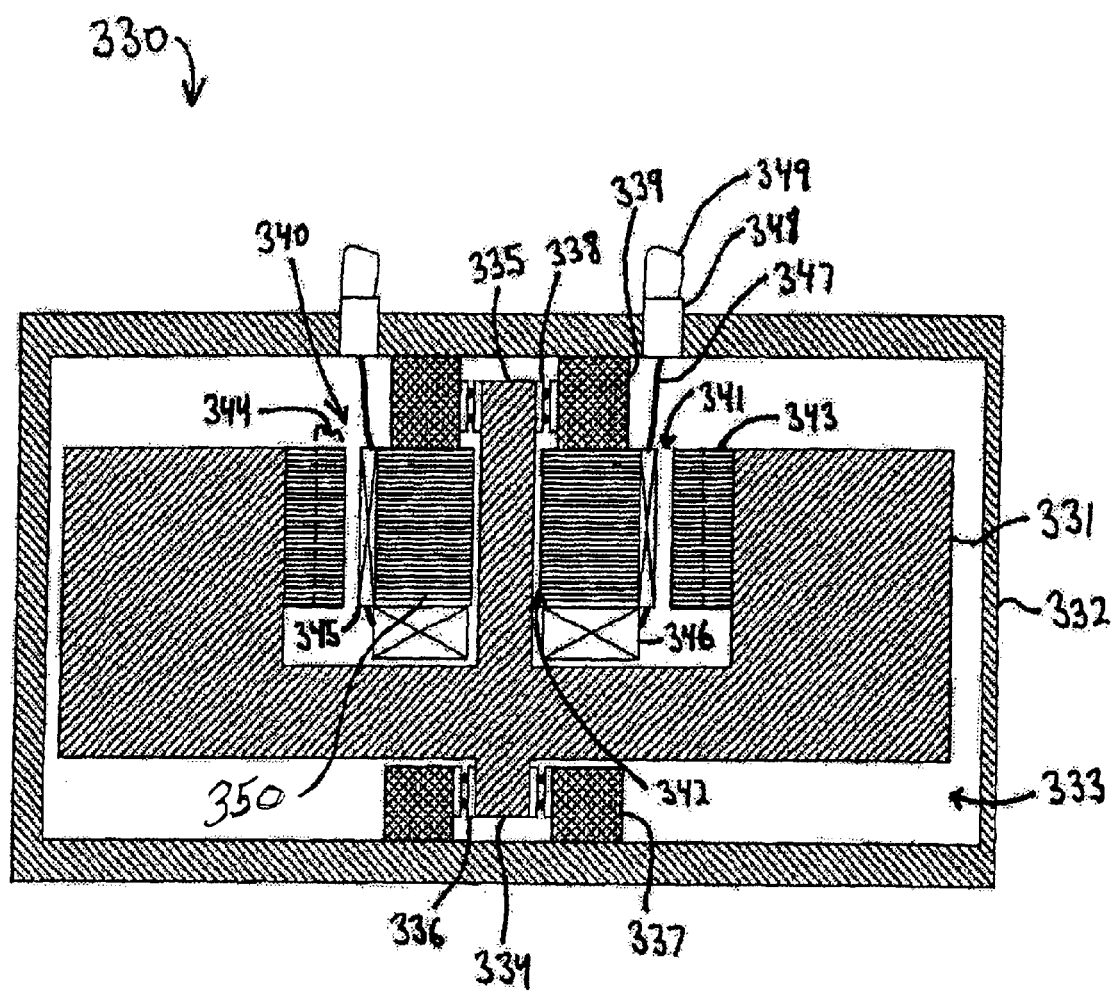
Figure 19:
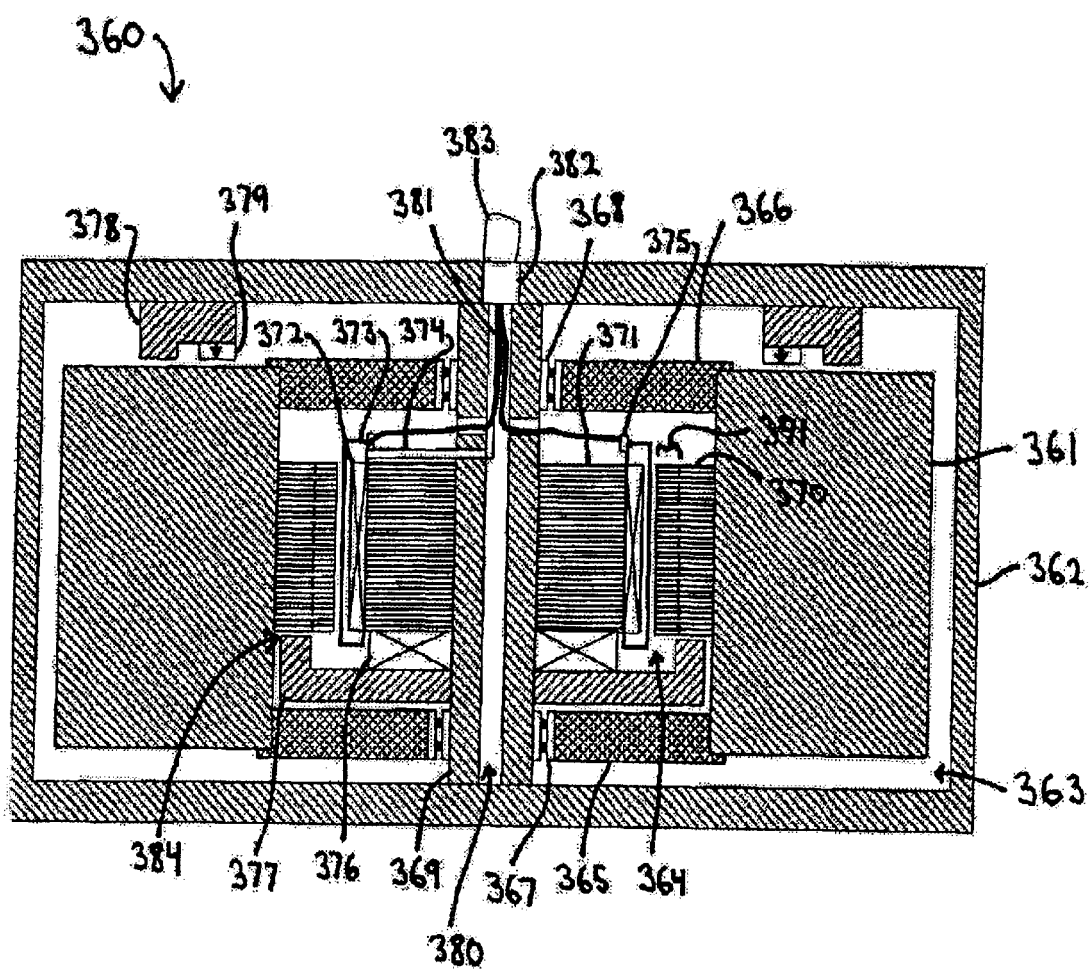

FIG. 18 is a schematic drawing of another inductor alternator flywheel system in accordance with the invention FIG. 19 is a schematic drawing of another inductor alternator flywheel system in accordance with the invention

DESCRIPTION OF THE PREFERRED EMBODIMENT

Figure 1:
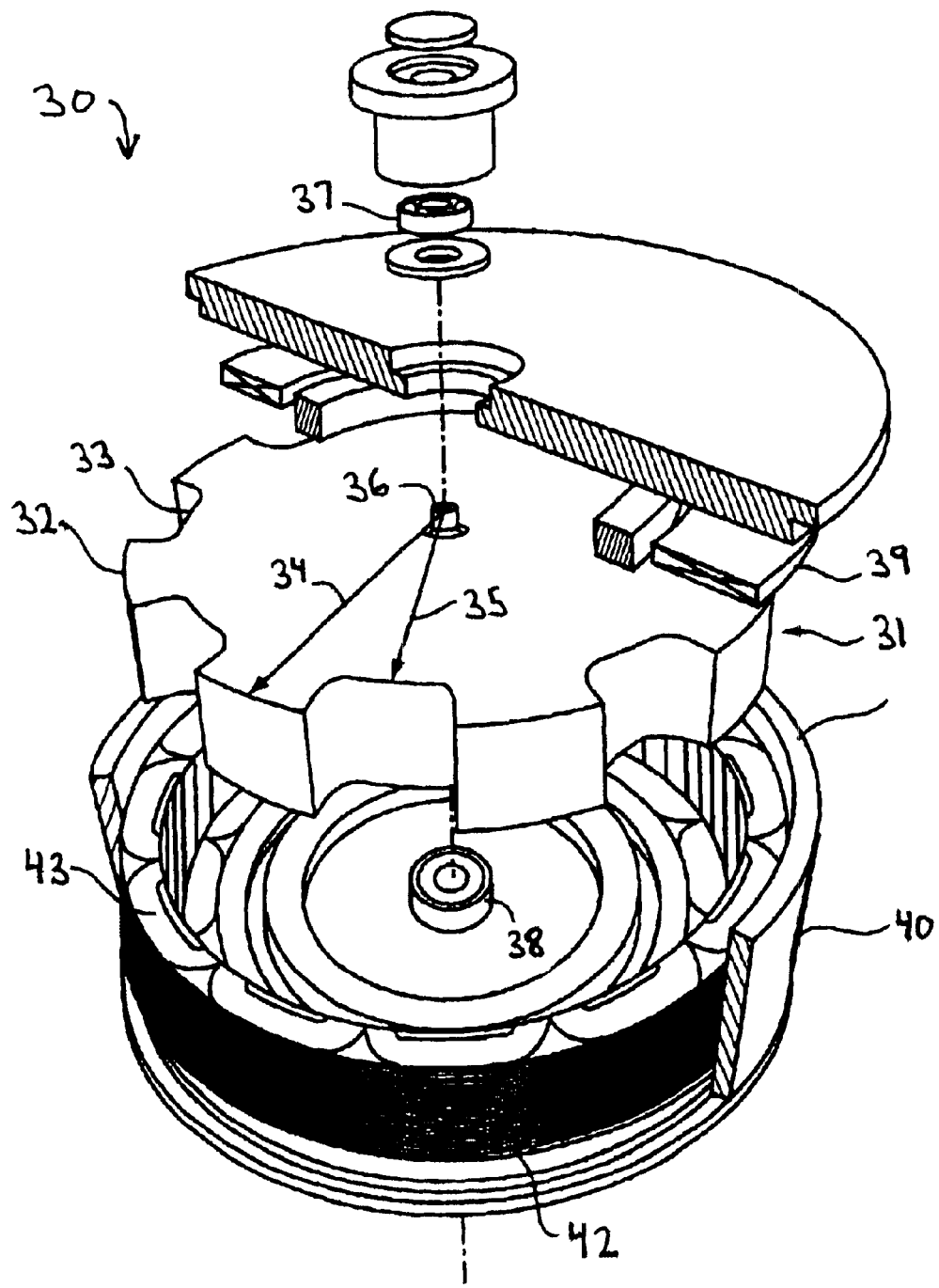
FIG. 1 is a schematic drawing of an inductor alternator flywheel system of prior art.
Figure 2:
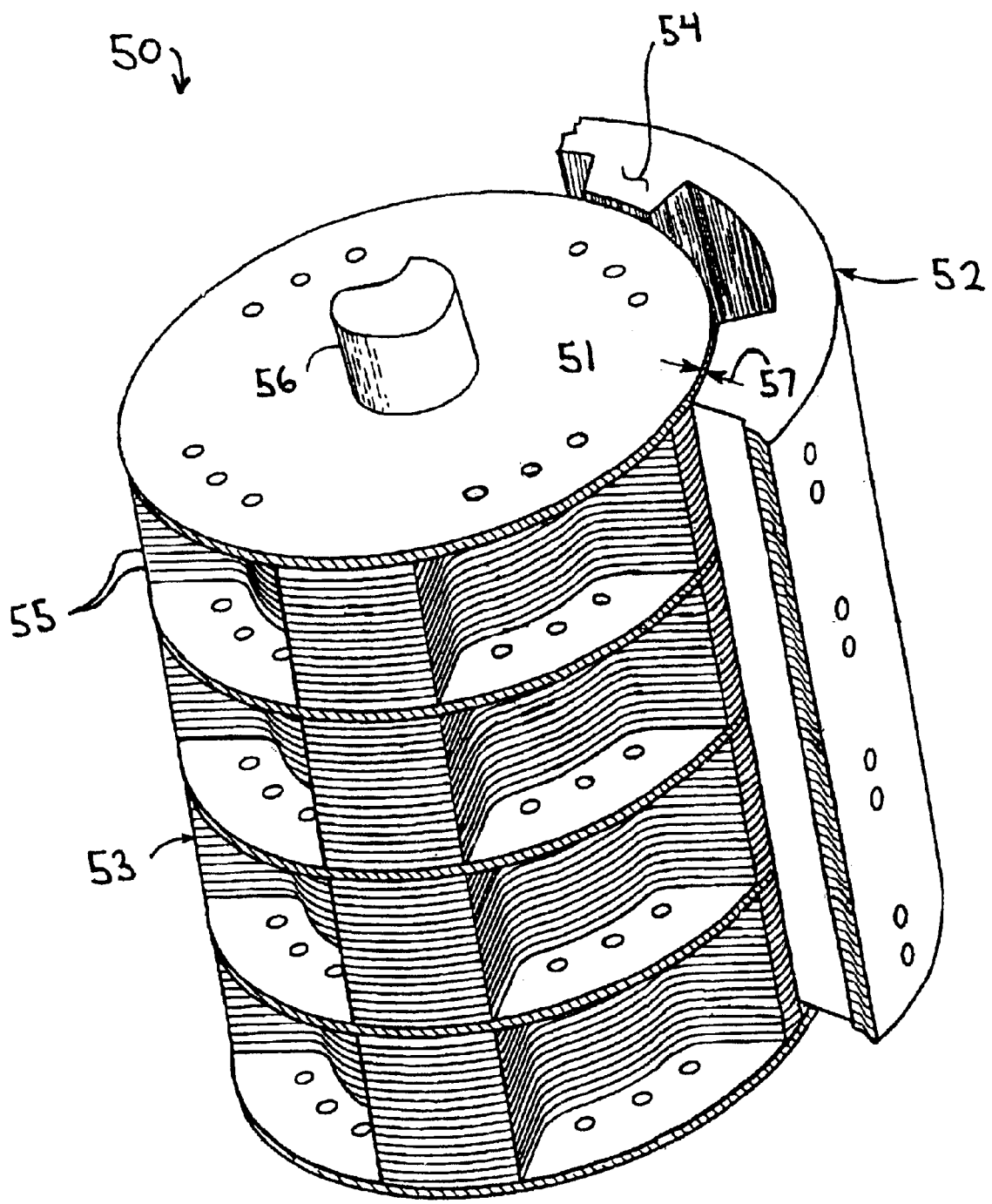
FIG. 2 is a schematic drawing of a laminated reluctance motor/generator of prior art.
Figure 3A:
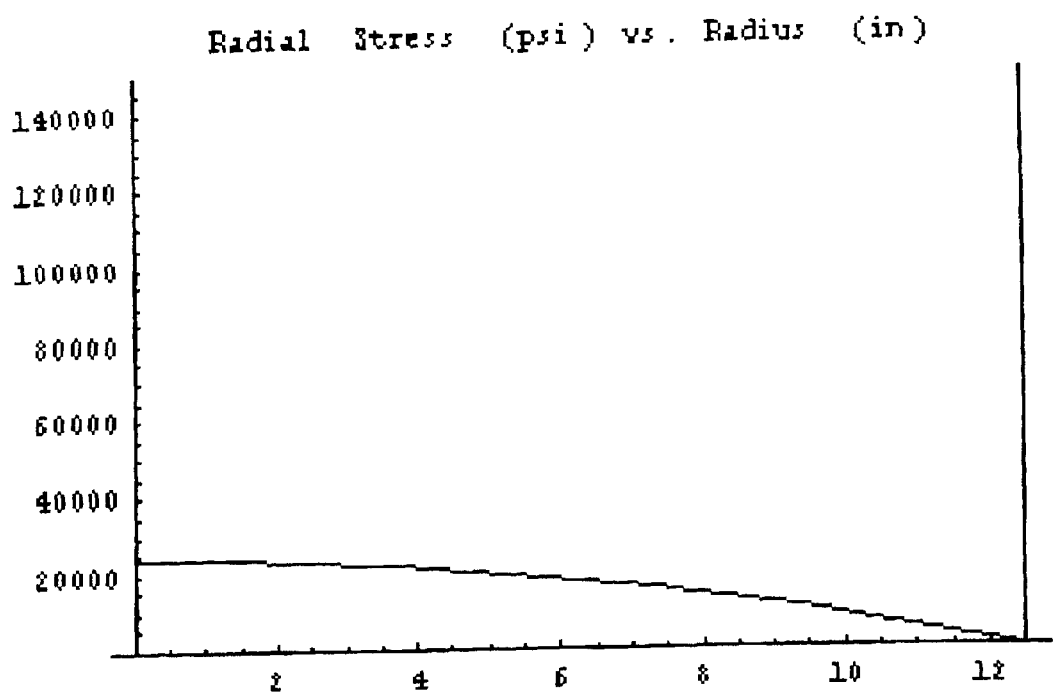
FIG. 3A is a radial stress distribution in the flywheel of FIG. 1, prior art.
Figure 3B:
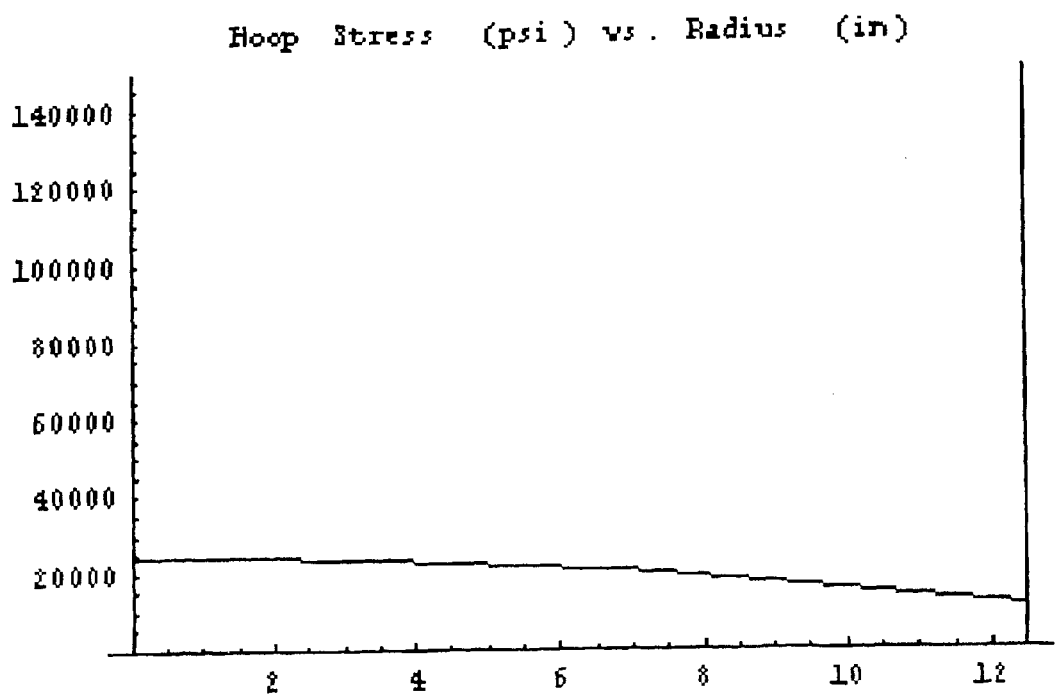
FIG. 3B is a hoop stress distribution in the inductor alternator flywheel system of FIG. 1, prior art.
Figure 4:
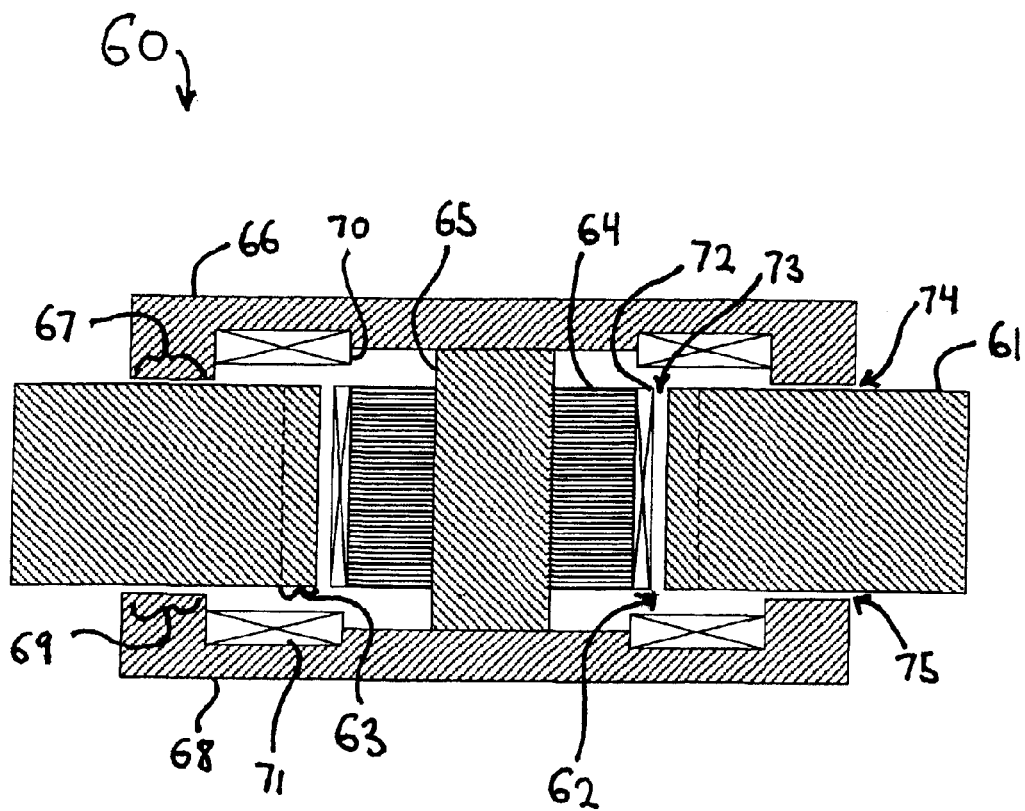
FIG. 4 is a schematic drawing of an inductor alternator flywheel system in accordance with the invention.

Turning to the drawings, wherein like characters designate identical or corresponding parts, an inductor alternator flywheel system 60 in accordance with the invention is shown in FIG. 4 in a basic form without bearings and other auxiliary components to clearly illustrate the functioning of the inductor alternator flywheel. The system uses a steel flywheel having a flywheel rim 61 in the form of an annular cylinder. An inductor alternator 62 for accelerating and decelerating the flywheel is integrated into the bore of the annular flywheel rim 61. The flywheel rim 61 has intrusions or inwardly extending radial projections 63 that act as the poles for the rotor of the inductor alternator 62. The inductor alternator stator is comprised of several pieces which include a laminated center cylinder 64, solid central shaft 65 and upper and lower yokes 66 and 68.

Upper and lower field coils 70 and 71 are used to drive magnetic flux through the yokes 66, 68, center shaft 65, radially outward through the laminated cylinder 64, through stationary armature coils 72, across a radial airgap 73, into the rotor 61 and axially outward through the axial air gaps 74 and 75. The flux crosses the axial airgaps 74, 75 and returns to the stator yokes 66, 68 though the axial poles 67 and 69. As the rotor rotates, the flux through the armature coils 72 changes due to the effects of the rotor poles or intrusions 63. The armature coils can be slot wound however, they are preferably air core such that they have reduced inductances for faster current rise times.

The inductor alternator flywheel system operates as follows. The flywheel is accelerated by applying synchronous AC power to the armature coils. The flywheel is kept rotating at its normal operating speed when primary power is functioning and power is continuously applied to the field coils. When primary power is interrupted, the inductor alternator supplies power to prevent a power interruption. As the speed of the flywheel decreases from energy being extracted, power to the field coil is increased to maintain a constant output voltage until most of the energy is used.

Normally the design of high speed flywheels that are constructed from metal such as steel are purposely made to be solid without a central hole. Adding a hole to a rotating metal disk causes the hoop stresses to more than double, limiting energy storage capability. Contrary to this well accepted convention, the invention achieves significant benefits from having a hollow center. Inductor alternators of prior art operate at relatively low tip speeds and stress levels. They also have high energy losses even at these speeds and power to the field coil or coils is reduced when in standby operation so as to reduce the losses. Increasing the operating speed of these systems would increase losses and eddy current losses in the rotor poles with the square of the speed. Locating the stator of the inductor alternator outside of the rotor is useful for easily removing the generated heat, however this makes the system more bulky. Considering the limited operating speed and the fact that the portion of the rotor in the center stores little energy due to its low inertia, the invention instead places the inductor alternator in the center of a hollow cylinder flywheel to create a much more compact system. Besides being smaller, the energy storage per weight is increased due to having a larger portion of the flywheel mass located at a larger diameter.

Figure 5:
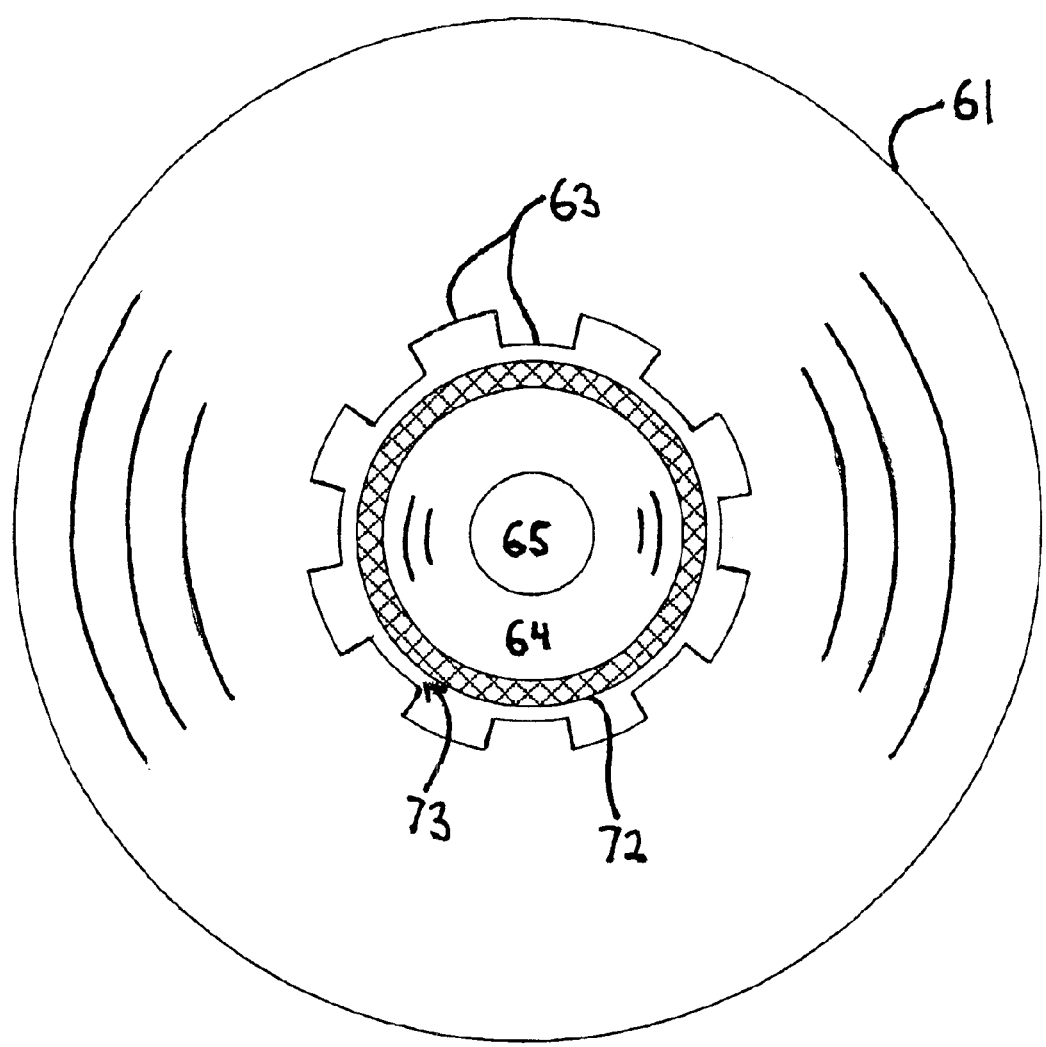
FIG. 5 is a schematic drawing (top view) of an inductor alternator flywheel of FIG. 4 in accordance with the invention.

The top view of an inductor alternator flywheel of FIG. 4 is shown in FIG. 5. The flywheel 61 is a hollow steel cylinder with internal intruding rotor poles 63. Although it is conceivable that a composite or other material rim could also be added to the cylinder, this would significantly increase costs. Inside the rotor 61 is located the stator portion comprised of a center stator cylinder 64 and a center steel shaft 65. The stator cylinder 64 can be fabricated of any high permeability, low loss material. Laminated magnetic steels such as silicon steel are preferred because they are readily available for relatively low cost. Surrounding the stator cylinder 64 are the armature coils 72. These are preferably wound with an air core and wound using Litz wire for low losses. Using an air core reduces the inductance and it also reduces radial destabilizing forces generated between the rotor and stator. A lower radial negative stiffness can reduce bearing loads and makes implementation of magnetic bearings easier. Between the outer diameter of the armature coils 72 and the inner diameter of the rotor poles 63 is the radial air gap 73.

Figure 6A:
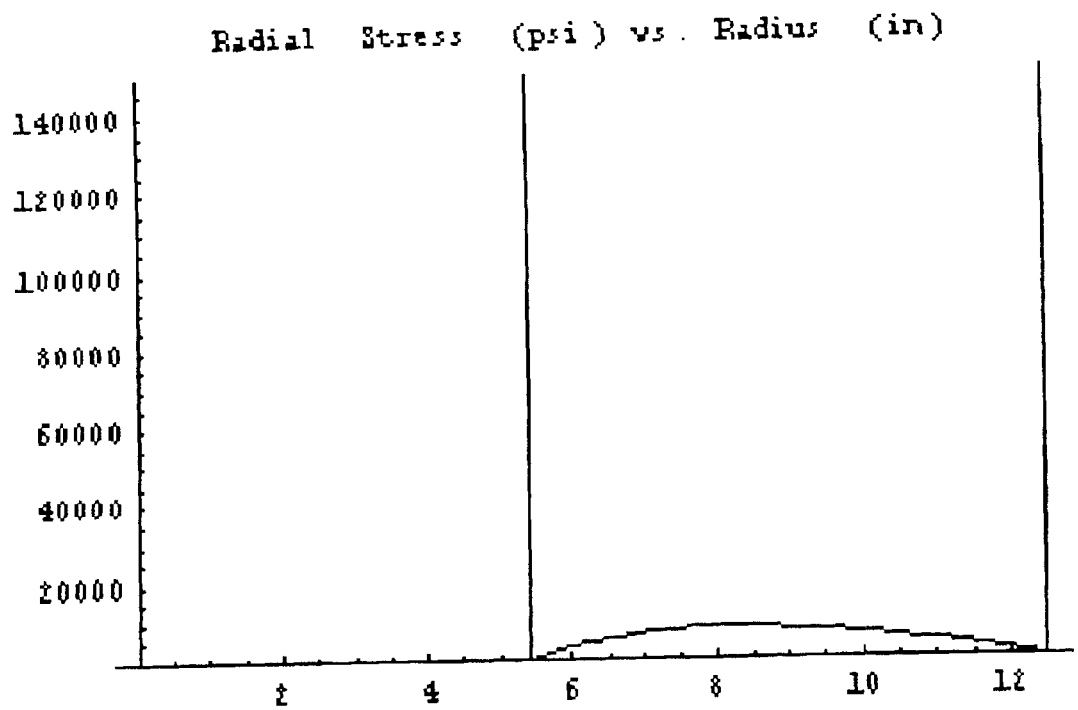
FIG. 6A is a radial stress distribution in the flywheel of FIG. 4, in accordance with the invention.
Figure 6B:
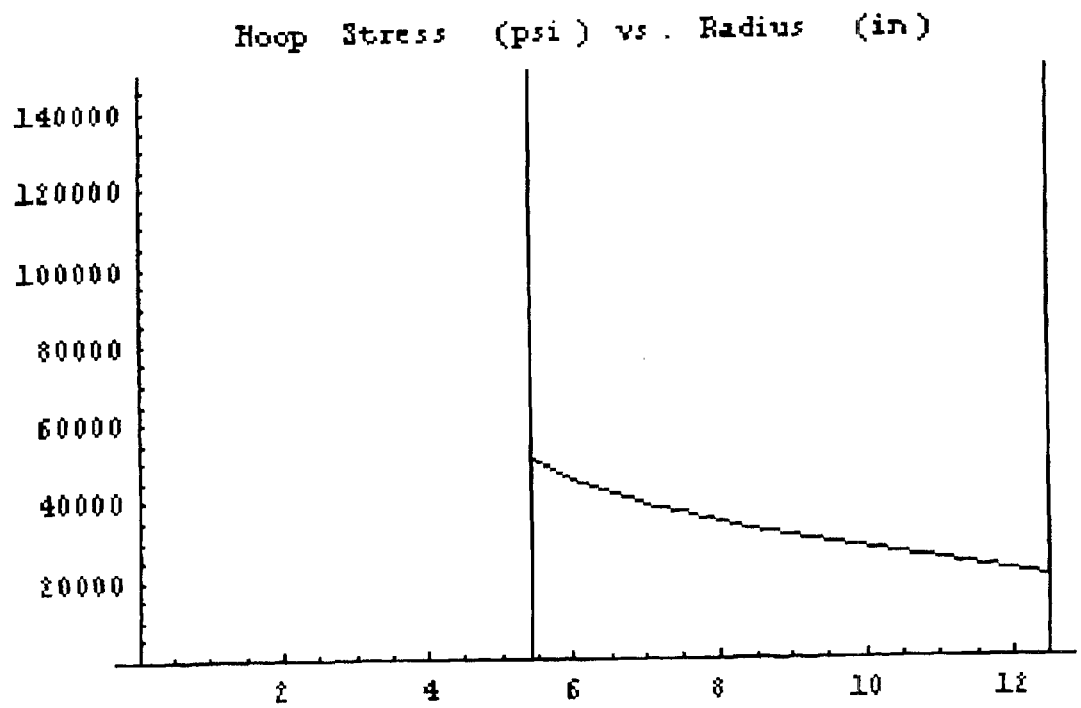
FIG. 6B is a hoop stress distribution in the flywheel of FIG. 4, in accordance with the invention.

As mentioned previously, having a central hole in the flywheel causes its maximum hoop stress to be more than double that of a solid disk with the same outer diameter and rotational speed. The radial and hoop direction stresses for an inductor alternator flywheel in accordance with the invention are shown in FIGS. 6A and 6B. The stresses are for a steel flywheel with 25 inch outer diameter, 10.8 inch inner diameter and rotating at 7000 rpm. The radial stress at the inner and outer diameters is zero and very low throughout. The hoop stress becomes highest at the inner diameter but is still acceptably low for structural steels at around 50 ksi. The hoop stress is not limiting the operating speed and hence the operating speed can be increased. For the highest speed rotation, the flywheel is preferably constructed from ally steel such as 4340 that has deep hardenability and good toughness. The flywheel is preferably quenched and tempered to achieve a high strength. The flywheel can be operated at the highest speeds by employing fracture mechanics analysis along with nondestructive evaluation of the flywheel. The flywheel is inspected to insure the maximum flaw size in the rotor is below a certain value, such as ⅛ inch. The strength of the steel and its plane strain fracture toughness resulting from the heat treatment process are then used in conjunction with the maximum flaw size to determine the maximum safe operating speed for the flywheel. The NASGROW equation for fracture mechanics can be applied for this solution and the number of expected cycles as well as the depth of the cycles also needs to be input. The steel inductor alternator flywheel rim preferably has a tensile yield strength above 100 ksi with a simultaneous planes strain fracture toughness greater than 70 ksi(in)^½. The rim can be fabricated by machining out the center, casting or other methods. However, the preferred method for manufacture is by forging, which promotes a solid structure and more preferably by rolled ring forging to align the grains of the steel in the hoop direction.

The invention allows for a more compact inductor alternator flywheel system with better energy storage per weight. Despite having higher stresses in the flywheel than previous designs, the flywheel rim is physically capable to rotate to even higher speeds. To proficiently operate at higher speeds, a second embodiment of the invention allows for greatly increasing the efficiency as will be shown. Because the inductor alternator is located at the center of the flywheel, the inductor alternator and flywheel rim can be separately optimized. The poles of the inductor alternator rotor can be formed in a liner and this liner can be attached to the inner diameter of the flywheel rim. This allows for the liner to be made from a low loss material and construction. The rim, which surrounds the liner and reinforces it, can thus be simultaneously made from a high strength steel and heat treated for maximum energy storage. The low magnetic loss liner complements the higher speed capability of the rim by having lower losses that allow for higher speed rotation. More importantly than increasing the operating speed, the lower losses from the inductor alternator allows the system to be acceptably operated with a fully energized field coil in normal operation. The field coil power is kept on such that when primary power fails, the inductor alternator instantly and automatically supplies fill power to the load. No time delay occurs from having to ramp up power to the field coils. Although systems of prior art could physically be run with full field coil power or alternatively using permanent magnets for a continuous field, the losses would be very high. The disclosed preferred method for operation of those systems is to keep the field coil power at a reduced value until the primary power fails and is detected. Obviously, this method of operation could also be used with the invention but it would have the drawback of having an interruption of power, which is sought to be eliminated. As the flywheel slows from energy being removed, the power to the field coil is further increased to maintain a substantially constant output voltage. If a constant output voltage were not required, the field coil power could be left constant.

Figure 9:
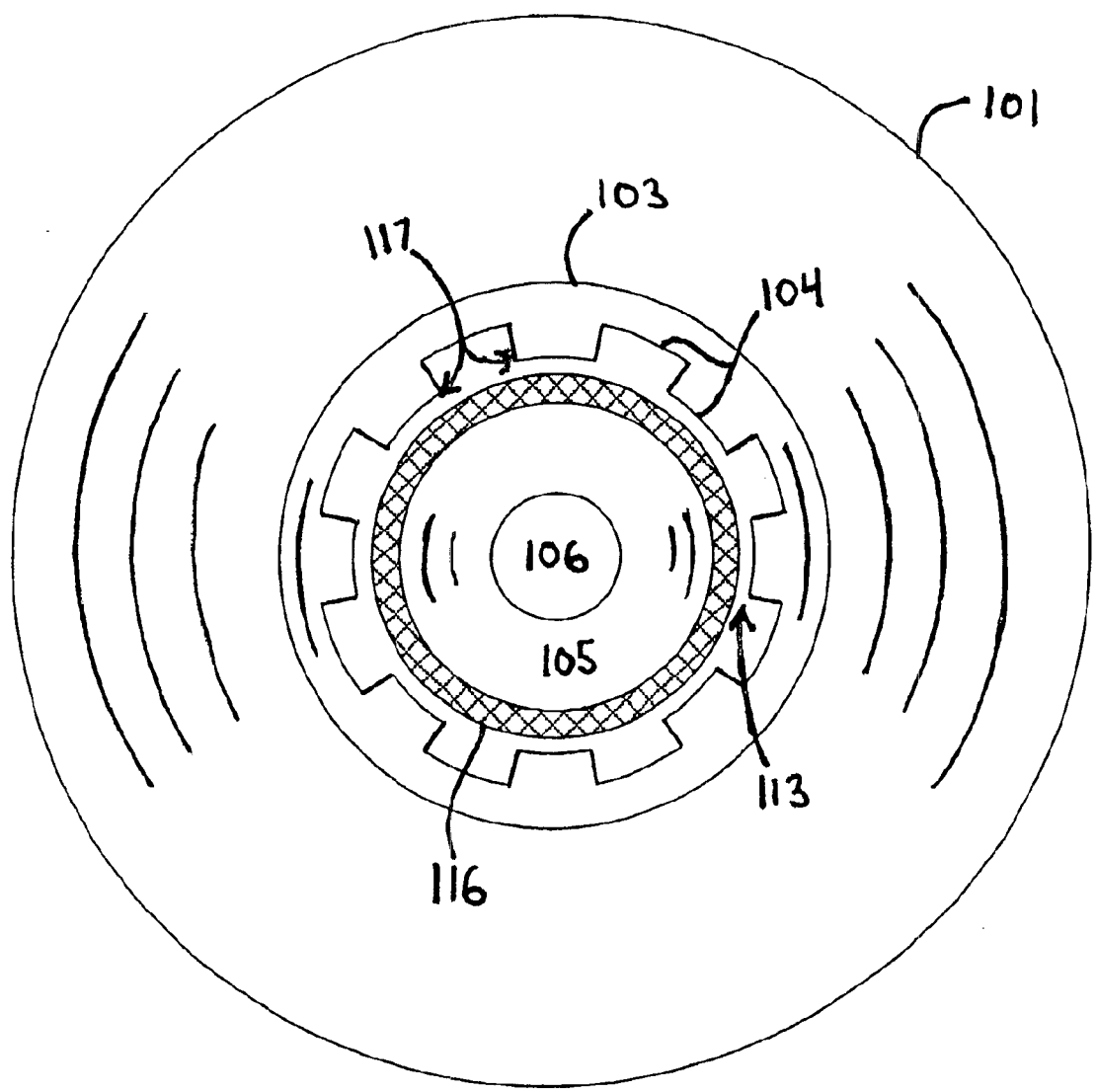
FIG. 9 is a schematic drawing (top view) of an inductor alternator flywheel of FIG. 8 in accordance with the invention.

The liner can be constructed numerous ways. The liner can achieve lower losses simply by using a lower loss material such as annealed silicon steel or even a ferrite. The liner would preferably be machined such that it would have the intruding rotor poles and then would be installed in the rim. Depending on the elastic modulus, density and strength of the liner, it can be bonded in place or alternatively it may require interference assembly into the rim bore. Shrink fitting of press fitting can do interference assembly. The top view of an inductor alternator flywheel with internal liner in accordance with the invention is shown in FIG. 9. The steel flywheel rim 101 has an internal liner 103 that contains the rotor poles 104. A stator comprised of an inner cylinder 105, preferably of laminated construction, and a central steel shaft 106 are located inside the liner 103. Air core armature coils 116 are attached to the outer diameter of the stator cylinder 105 and a radial air gap is formed between the outer diameter of the armature coils 116 and the inner diameter of the rotor poles 104. The corners 117 of the poles 104 can be left sharp or they can be rounded so as to reduce generated harmonics.

Figure 10A:
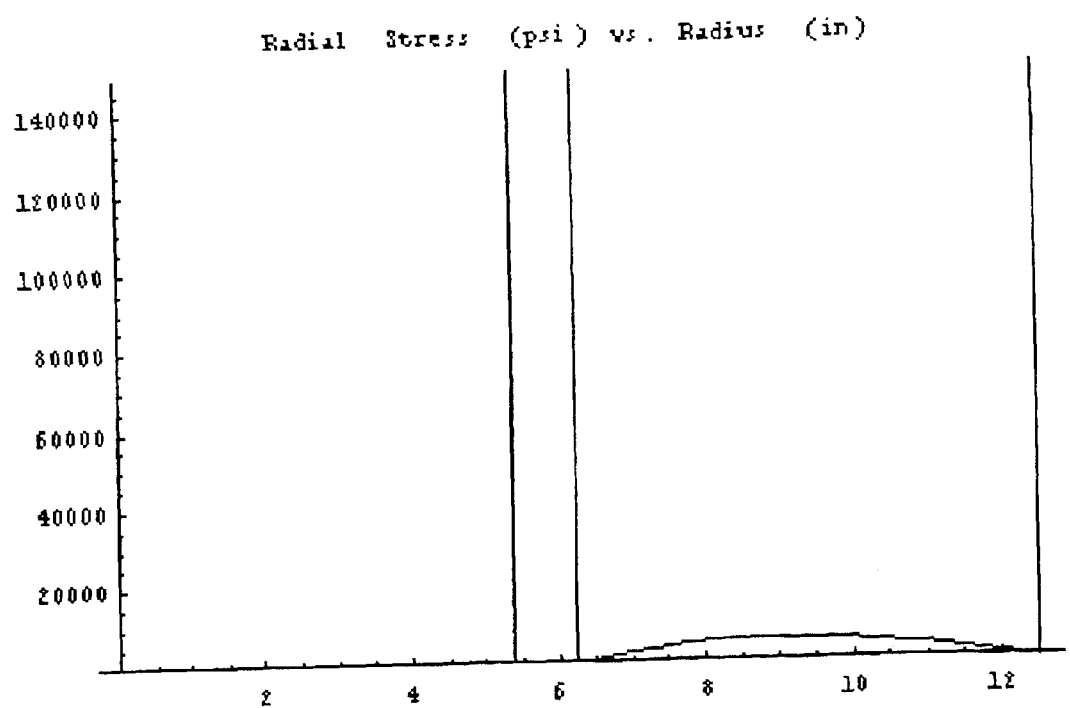
FIG. 10A is a radial stress distribution in the flywheel of FIG. 8, in accordance with the invention.
Figure 10B:
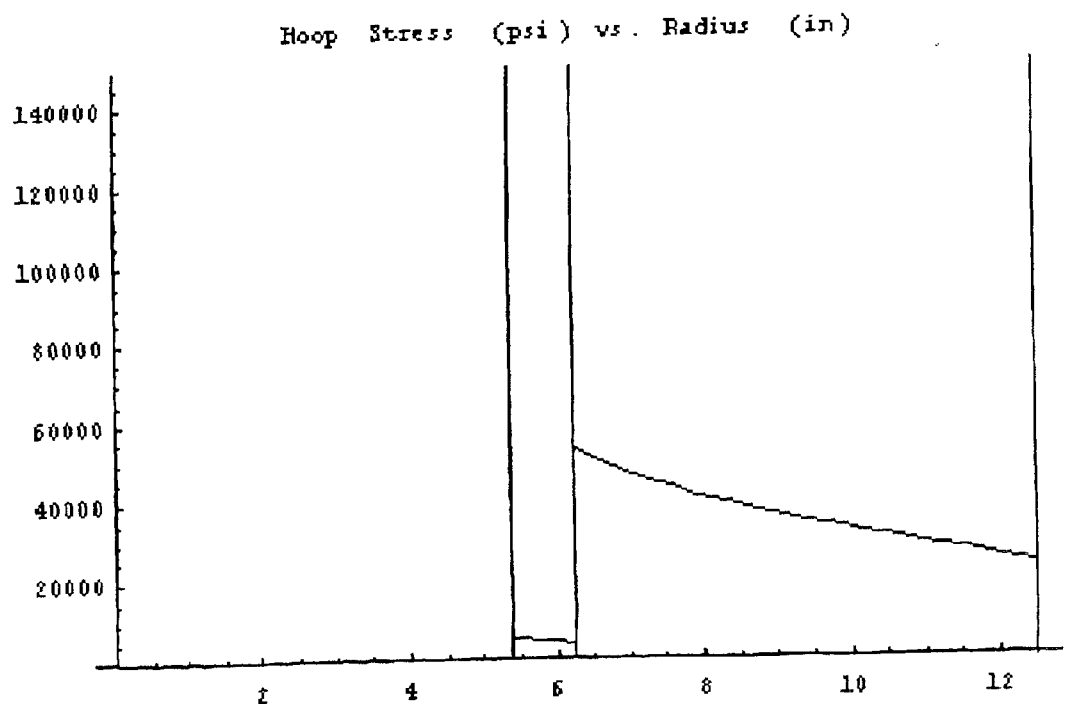
FIG. 10B is a hoop stress distribution in the flywheel of FIG. 8, in accordance with the invention.

The radial and hoop stresses in a flywheel rim and liner using a shrink fit in accordance with the invention are shown in FIGS. 10A and 10B. The steel rim has an outer diameter of 25 inches and an inner diameter of 12.48 inches with a steel liner outer diameter of 12.5 inches and inner diameter of 10.8 inches. This interference is achievable using liquid nitrogen to cool the liner. As shown the stresses are for rotation at 7000 rpm. Higher speed rotation is possible as well as use of different rim and liner dimensions. Besides allowing for increased efficiency, the inductor alternator flywheel construction of the invention serves additional purposes. The maximum hoop stress occurs at the inner diameter of the flywheel rim, which is made to have high strength. The stress in the liner, which has lower strength, is made to be extremely low due to the interference assembly. The liner also increases the operating speed of the flywheel rim. The liner necessarily has the large intrusions or rotor poles. These intrusions cause stress risers that if were formed into the bore of the flywheel rim could negatively impact the allowable operating speed. However, since the poles are formed into the liner and the liner is operating at very low stress, the speed of the inductor alternator can thus be made very high.

Figure 7:
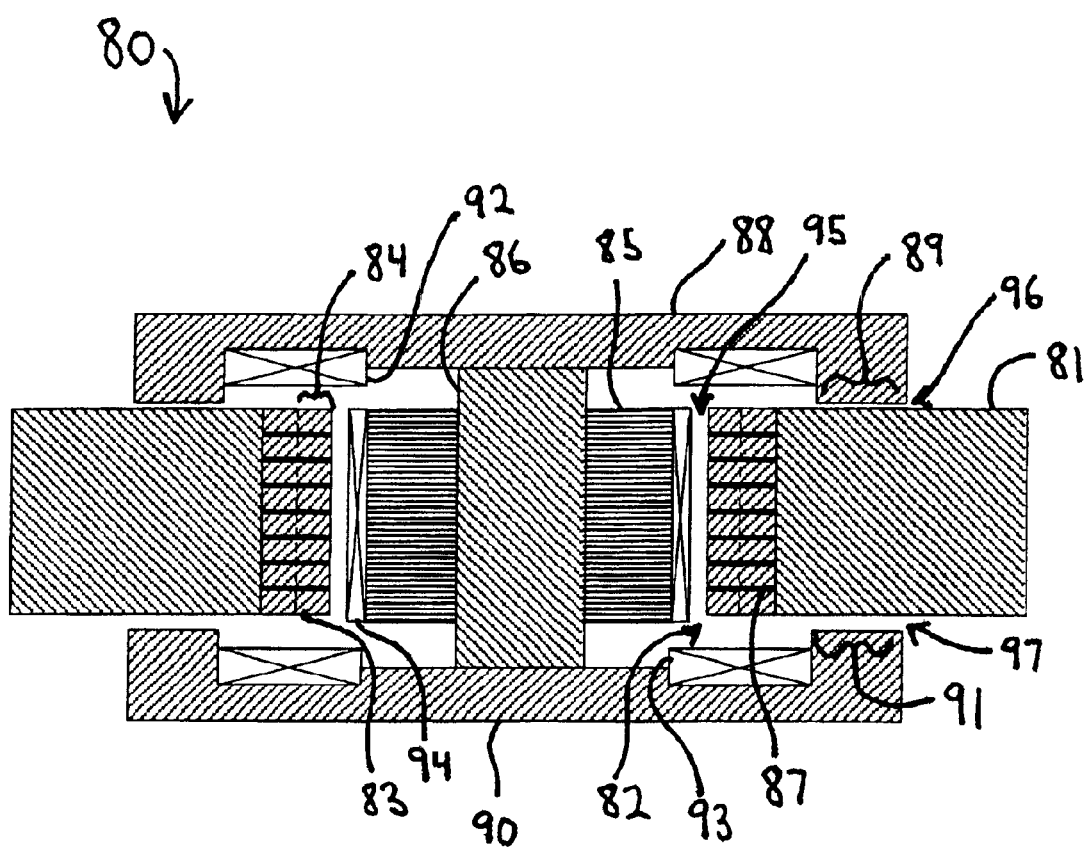
FIG. 7 is a schematic drawing of an alternate inductor alternator flywheel system in accordance with the invention.

In another embodiment of the invention, the rotor liner is constructed from multiple axially stacked layers, thereby enhancing the efficiency of the inductor alternator. As shown in FIG. 7, an inductor alternator flywheel system 80 with a layered liner in accordance with the invention includes a steel rim 81 with an internal inductor alternator 82. A liner 83 inside the rim 81 is constructed from multiple axial layers instead of a single piece. The layers are separated by electrical insulation 87 that prevents development of large eddy currents in the liner 83. The liner 83 has internal poles 84, similar in shape to the poles 63 in FIG. 5, for operation as an inductor alternator rotor. The insulation 87 can be made from plastic or can simply be a paint or enamel applied to the individual layers of the liner 83. The use of multiple axial layers for the liner 83 also has the advantage of making machining easier due to the reduced thickness.

The alternator 82 includes a fixed stator having a laminated center cylinder 85 attached to a center steel shaft 86. A plurality of armature coils 94, each wound on an axis oriented radially and facing the rotor poles 84, are located in the air gap 95 between the outer diameter of the stator cylinder 85 and the inner diameter of the rotor poles 84. Upper and lower field coils 92 and 93 produce magnetic flux, and upper and lower yokes 88 and 90 provide a flux return path. The flux through the rim and the yokes and center shaft is maintained essentially uniform, homopolar, and does not change with the rotation of the rotor. Because of this, these structures need not be constructed of low loss magnetic materials to reduce losses. The laminated stator cylinder 85 and low loss rotor liner 83 diffuse varying fluxes before the flux enters the center shaft 86, rim 85 or yokes 88 and 90. The flux exiting the rim exits through upper and lower axial air gaps 96 and 97 and enters yoke poles 89 and 91. Although it is conceivable that the yoke poles 89,91 could be made to act directly on the axial ends of the liner 83, this could result in a larger effective air gap due to the insulating layers 87.

Figure 8:
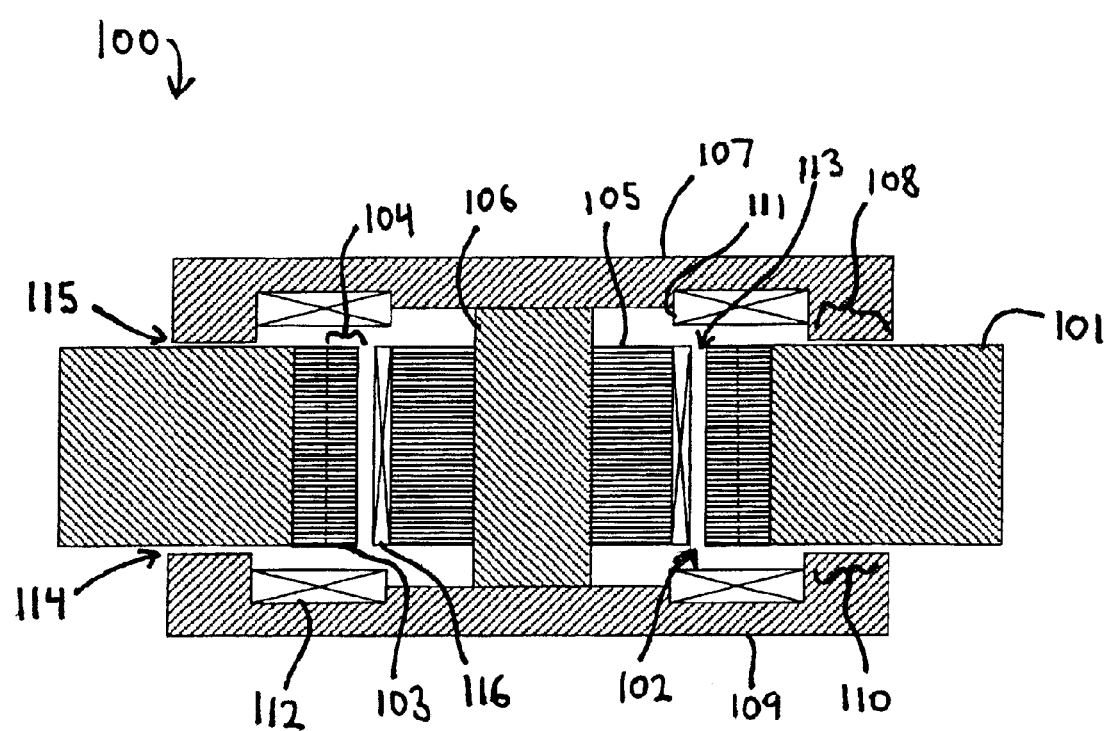
FIG. 8 is a schematic drawing of a another alternate inductor alternator flywheel system in accordance with the invention.

The concept of constructing the liner 83 from multiple axially stacked layers for reduction of losses can be taken a step further, as illustrated in FIGS. 8 and 9. The liner 103 in the embodiment of FIG. 8 can be comprised of laminations similar to the inner stator cylinder 85 of FIG. 7. The inductor alternator flywheel system 100 with laminated rotor liner 103, shown in FIG. 8, includes a annular steel flywheel rim 101 with internal inductor alternator 102. The rim liner 103 is interference assembled in the bore of the rim 101 and contains inwardly protruding radial poles 104 of the same general shape as the poles 63 shown in FIG. 5. The liner 103 is preferably constructed from laminating steel, silicon steel or other type of electrical lamination material commonly employed in motor/generators, transformers and magnetic devices. Cold rolled laminating steel offers reduced losses and easy stamping. Silicon steels offer further reduced losses from having a higher resistivity. Although they more rapidly wear stamping tools, they can be readily and economically cut from sheet stock by laser or waterjet cutters. Nickel type laminations offer higher permeability at low inductions and low losses, but they are very expensive. The laminations are preferably used in the annealed state for the best magnetic properties although other conditions of the lamination material could be used. The coatings between layers can include oxides, enamels or other types known in the art.

The stator includes a laminated center cylinder 105 and a center steel shaft 106, and is located concentric to the flywheel 101 and in its hollow bore. Armature coils 116 attached to the outer diameter of the stator cylinder 105, with their axes oriented radially, provide for power conversion. As shown in FIG. 9, a radial air gap 113 is formed between the outer diameter of the stator cylinder 105 and the inner diameter of the poles 104. Field coils 111 and 112 provide flux for operation. Yokes 107 and 109 provide a return path for the flux through air gaps 114 and 115 and yoke poles 108 and 110.

Figure 11:
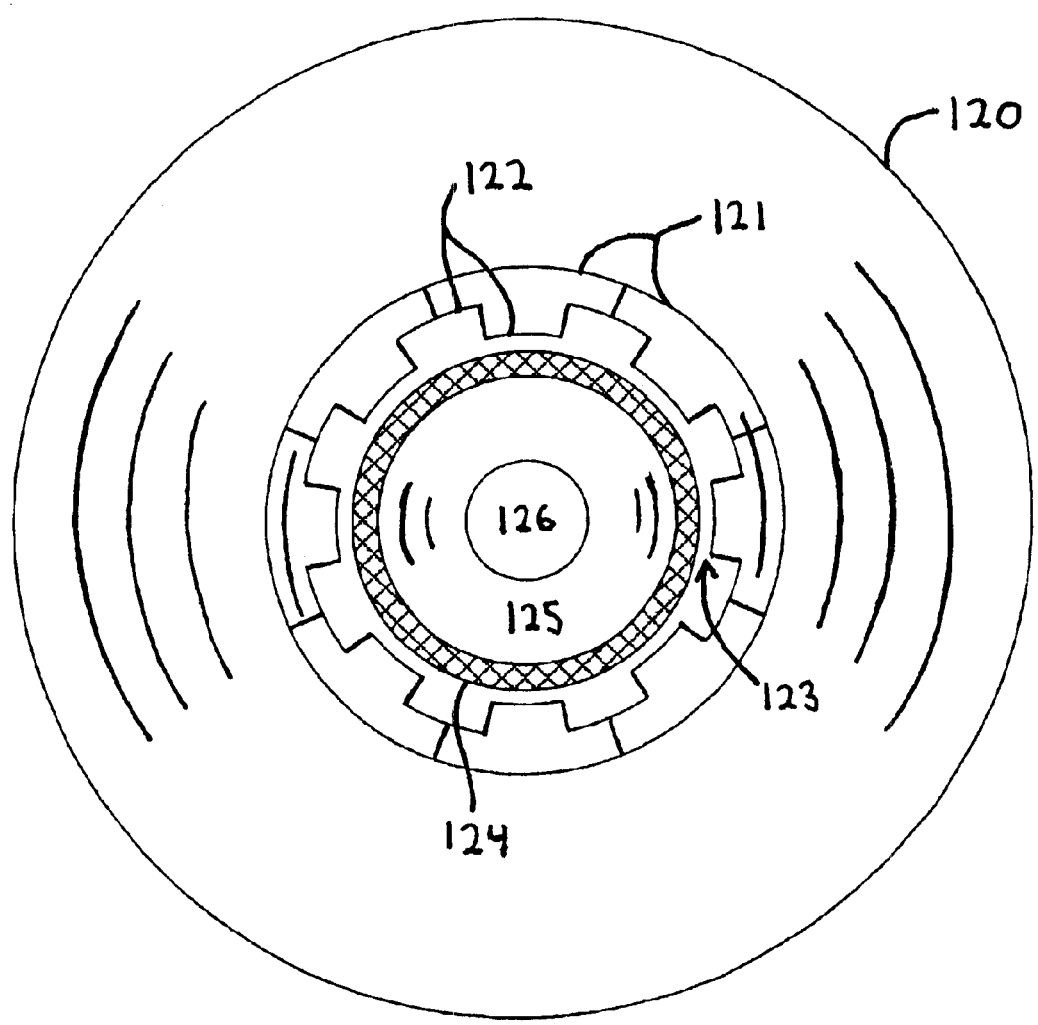
FIG. 11 is a schematic drawing (top view) of an inductor alternator flywheel with multiple circumferential piece liner construction in accordance with the invention.

Although the hoop direction stresses in the rotor liner can be made very small through the use of an interference fit with the rim, an alternate configuration and embodiment of the invention can reduce these stresses essentially to zero. Instead of making the liner as a single ring construction, whether it is solid or an assembly of axial layers, the liner can be made from multiple segments around the circumference. A top view of an inductor alternator flywheel with multiple circumferential piece liner construction in accordance with the invention is shown in FIG. 11. The flywheel rim 120 has an internal liner constructed from multiple pieces 121. Inwardly extending protrusions or teeth form the rotor poles 122 for operation as an inductor alternator. As the flywheel 120 is rotated to high speed, the liner pieces cannot develop significant hoop direction stresses because they are not from a continuous piece. The liner pieces 121 can be bonded in place or alternatively mechanically fastened such as by use of an axial clamping mechanism, not shown. Besides reducing hoop stresses in the liner, the use of multiple piece construction has the potential for reduced costs. Making the liner from a single ring construction results in wasted material from the center. Making the liner from smaller arc segments 121 can provide better material utilization. As before, the stator with laminated cylinder 125, center shaft 126 and armature coils 124 are located in the center of the rotor. The radial air gap 123 is formed between the inner diameter of the liner and the outer diameter of the stator cylinder 125.

The invention has been shown as a flywheel and integrated induction alternator so far. Now, a brief description is provided of some illustrative examples of incorporating the flywheel and integrated induction alternator in a complete flywheel power system. These examples are not intended to be exhaustive and other structures will occur to those skilled in the art in light of this disclosure, and these other structures are intended to be encompassed by the spirit and scope of the claims. Two components useful for operation of a flywheel electrical power system include bearings for supporting the flywheel for rotation, and a container for maintaining a vacuum around the flywheel.

Figure 12:
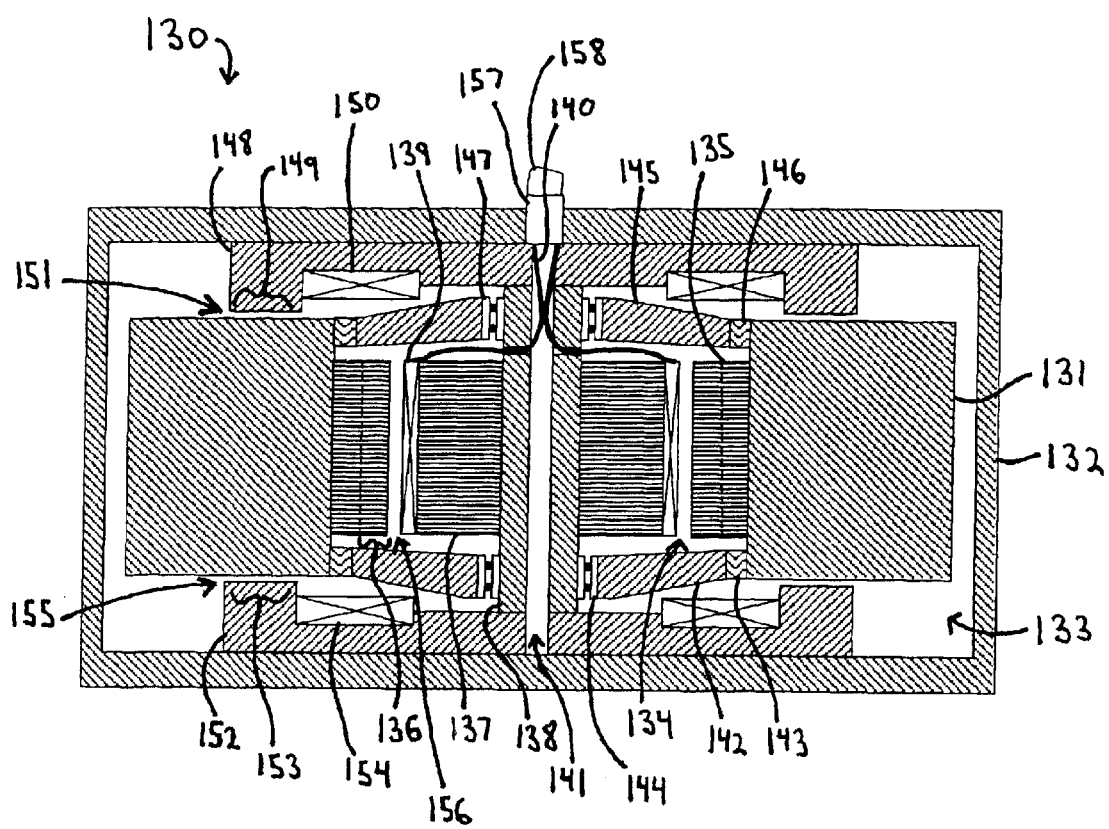
FIG. 12 is a schematic drawing of another inductor alternator flywheel system in accordance with the invention.

One complete inductor alternator flywheel system 130 in accordance with the invention, shown in FIG. 12, includes a steel flywheel 131 with a hollow center for receiving an inductor alternator 134. The flywheel 131 is enclosed in a container 132 having an internal chamber 133 that is maintained at low pressure for reduction of aerodynamic losses. The flywheel 131 is supported for rotation through use of upper and lower mechanical bearings 147 and 144. The bearings 147, 144 support the flywheel rim through use of upper and lower hubs 145 and 142, and upper and lower radial spline sliding joints 146 and 143. The hubs 147, 144 or spline sliding joints 145, 142 (or both) are preferably constructed to have a high reluctance to prevent shorting the flux in the inductor alternator between the central shaft 138 and the rim 131. The hubs could be constructed of aluminum to accomplish this task.

The rotor liner 135 has laminated construction and is interference assembled into the bore of the rim 131. Teeth 136 in the liner 135 create the rotor poles in the manner shown in FIGS. 9 or 11. The stator, located in the center of the inductor alternator 134 is comprised of a laminated or other low loss construction cylinder 137. A central steel shaft 138 provides both a mounting structure for the bearings 147, 144 and a path for the flux created by field coils 150 and 154. Armature coils 139 are located outside the stator cylinder 137 with a radial air gap 156 between them and the inner diameter of the poles 136. A central hole 141 in the center shaft 138 provides a route for the armature coil wires 140 to exit from the center of the flywheel 131. An electrical feedthrough 157 provides a vacuum tight seal for connection to external cabling 158. The upper and lower field coils 150 and 154 provide flux for operation and yokes 148 and 152 provide a return path for the flux. Both field coils 150, 154 can be operated in parallel or alternatively, they can be operated so as to cooperate and lift a majority of the axial weight of the flywheel 131 from the mechanical bearings 144, 147. Removing load allows for both higher speed operation and for much longer bearing life. A load cell or other sensor, not shown, can be used to provide feedback to the load carrying function of the poles 149 and 153. Increasing power to the upper field coil 150 relative to the lower field coil 154, increases the flux through the upper yoke pole 149 and air gap 151 relative to the lower yoke pole 153 and air gap 155. This results in an upward force exerted on the flywheel 131. The container 132 enclosing the flywheel 131 is preferably constructed to prevent transmission of a large flux that would short out the flux from the inductor alternator 134. The container 132 could be constructed from aluminum or other low permeability material, or alternatively the upper an lower yokes 148, 152 could be magnetically insulated from the container by using a sufficient intermediate magnetic insulating layer, not shown.

Figure 13:
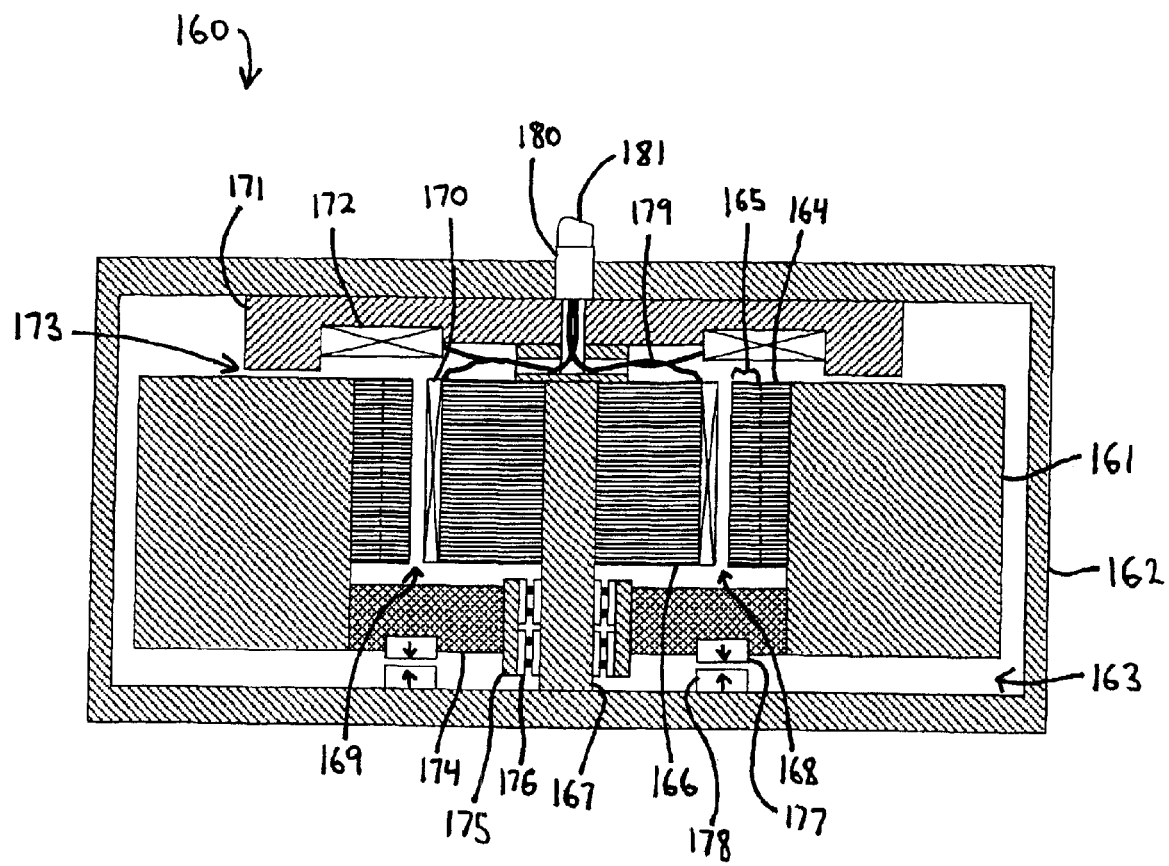
FIG. 13 is a schematic drawing of another inductor alternator flywheel system in accordance with the invention.

An alternate configuration of an inductor alternator flywheel system 160 in accordance with the invention, shown in FIG. 13, uses only a single field coil. This configuration and all of the others illustrated in this disclosure, show different attributes and embodiments of the invention. The elements of one configuration are not meant to be exclusive to that combination of elements shown and hence could be applied in other combinations with elements from other configurations while still being in accordance with the invention. The flywheel system 160 is comprised of an annular hollow steel flywheel 161 with internal inductor alternator 168. The flywheel 161 is housed in a sealed container 162 having an internal chamber 163 maintained at a low pressure for low aerodynamic drag at high rotation speed. The flywheel is supported for rotation, preferably about a vertical axis, through use of mechanical bearings 176 attached to a central shaft 167. The bearings 176 are housed in a central tube 175 and a high reluctance hub 174 connects the rim 161 to the central tube 175. Aluminum or other low permeability material can be used for the hub 174 which can be shrunk fit inside the rim 161. The life of the mechanical bearings 176 is increased by removing axial load from the flywheel using rotating permanent magnets 177 attached to the hub that axially repel stationary magnets 178. A passive magnetic bearing 177 and 178 makes the control of flux in the inductor alternator possible using one field coil while still having a majority of the flywheel weight removed from the mechanical bearings 176.

A laminated rotor liner 164 with internal poles 165, as described in FIGS. 9 or 11, is interference fit inside the rim 161. A plurality of armature coils. 170, oriented with their axes pointed radially, provide for energy insertion and extraction. A laminated stator cylinder 166 is attached to the central shaft 167 and magnetically linked to the upper yoke 171 through the central shaft 167 with flux generated by the field coil 172. This field coil 171 provides all of the flux for operation. The flux links the yoke and the rim 161 through the axial air gap 173. Because the mechanical bearings 176 are both located to one side of the inductor alternator 167, the wires 179 from the armature coils 170 can easily exit the flywheel 161 at the top. The wires 179 exit the container 162 through a vacuum feedthrough 180 and connect to external cabling 181.

Another configuration of the invention can be achieved with the inductor alternator divided into two individual units, as shown incorporated in a flywheel system 190 in FIG. 14. Dividing the system into two inductor alternators can have the advantages of allowing one to function as the motor and one as the generator, mechanically balancing the system, or for providing multiple different output voltages. The flywheel system 190 includes a hollow steel flywheel 191 that rotates inside a container 192 having an internal chamber 193 maintained at low pressure. The flywheel rim 191 is connected to a central shaft 195 by way of a center non-ferromagnetic hub 194. The central shaft 195 is journalled for rotation in upper and lower bearings 206 and 216. The bearings 206, 216 are attached with spring dampers 207 and 217 to upper and lower bearing mounts 205 and 215. The bearing mounts 205, 215 also support the upper and lower stator laminations 204 and 214 and provide axial flux paths to upper and lower stator yokes 211. Upper and lower inductor alternators 197 and 196 are formed at the respective ends of the flywheel 191. The stators 204, 214 contain armature coils on the outer diameter and radial air gaps 198 and 199 are formed between them and the inner diameter of the rotor liners 200 and 202. The rotor liners 200, 202 contain inner poles 201 and 203, shaped as shown in FIGS. 9 or 11. Field coils 210 and 218 drive flux through the upper and lower inductor alternators 197, 196. Armature coil and field coil wires 208 and 222 exit the container 192 through vacuum feedthroughs 209 and 223. The yokes 211 magnetically couple to the rim 191 through axial faces 212 and 219 and through axial air gaps 221 and 220. Construction of the container and or central shaft must include considerations for preventing the shorting the flux generated by the field coils 210, 218.

Longer life and or higher speed operation can be achieved with the inductor alternator flywheel system by using full levitation magnetic bearings. An inductor alternator flywheel system 230 using such a full levitation magnetic bearings in accordance with the invention, as shown in FIG. 15, includes an annular steel flywheel 231 enclosed inside an evacuated chamber 232 within a container 232. An internal inductor alternator 234 is formed by a laminated rotor liner 236 with intruding poles 237, and a stator formed from a laminated center cylinder 238, a center steel shaft 239, and armature coils 249. A radial air gap 235 is defined between the armature coils 249 and the inner diameter of the rotor poles 237. This configuration of the invention shows several different attributes. The stator coils 249 are enclosed in a stator vessel 250 that can be partially or completely filled with liquid coolant to provide cooling. Fluid connection tubes 241 can be included if the fluid is to be pumped. The tubes 241 are connected to a pump (not shown) external to the container 232. The wires 252 from the armature coils 249 exit the stator vessel 250 through sealed electrical feedthroughs 251 and they exit the center of the flywheel 231 though a radial hole which communicates with a central hole 240 in the center shaft 239. The wires 252 exit the flywheel container 232 through another electrical feedthrough 253 and connect to external cabling 254.

The flywheel 231 is supported for rotation using a fill levitation magnetic bearing system having upper and lower magnetic bearing rotors 246 and 244 that cooperate with upper and lower magnetic bearing stators 247 and 243. The magnetic bearing stators 243, 247 are attached to the center shaft 239. The magnetic bearing rotors 244, 246 are attached to upper and lower hubs 245 and 242. The hubs 242, 245 have an angled configuration that allows them to bend and stay connected to the inner diameter of the rim 231 despite radial growth of the rim at high speed. Also attached to the inner diameter of the hubs 242, 245 are mechanical auxiliary bearings 243 and 248 that provide support when the magnetic bearing system is not operating. The upper and lower magnetic bearings 246, 247, 244, 243 provide radial support for the flywheel 231. At least one axial magnetic bearing must be used to provide fully stable five axes levitation. The axial magnetic bearing can be added separately or could be combined with the radial magnetic bearings 246, 247, 244, 243.

Alternatively, the inductor alternator field coils 259 and 262 can provide the function of the axial magnetic bearing. This embodiment could also be applied to other designs of inductor alternator flywheel systems. The field coils 259, 262 provide flux through yoke poles 256 and 260 forming axial air gaps 257 and 261. The field coils support the entire weight of the flywheel 231, providing full axial levitation Removing load from mechanical bearings could be done by simply using a load cell to measure the bearing force or using a constant current difference between the upper and lower field coils. However, for full levitation the flywheel becomes axially free and achieves dynamic stability and stable levitation. An axial position sensor, not shown, is preferably used to provide control feedback. The feedback could directly control power to the field coils 259, 262. Unfortunately, the feed coils 259, 262 are preferably wound to be large, having many turns and a high inductance, such that they can generate a substantial flux for operation of the inductor alternator with low field power consumption. The large inductance of the field coils 259, 262 gives them a very slow response time. This makes control for full levitation extremely difficult. To solve this problem, the flux from the field coils 259, 262 is used to provide bias flux for the axial magnetic bearing. Separate smaller control coils, which can be located adjacent the field coils 259, 262, are provided having lower inductances and faster response times. These control coils provide axial control that is amplified from having bias flux of the field coils 259, 262 because the forces generated are proportional to the square of the flux densities. The control coils could also be located in other positions to add flux to the flux in the air gaps 257 and 261, still using the field coils 259, 262 for providing bias flux.

In all of the flywheel system configurations thus far, the inductor alternator flux has traveled radially outward through a stationary portion. It is also possible to make the center cylinder, from which flux exits to pass through the armature coils, rotating with the flywheel. Such an inductor alternator flywheel system 270 with a rotating center portion in accordance with this aspect of the invention is shown in FIG. 16. The flywheel system 270 is comprised of a steel flywheel rim 271 that rotates inside an evacuated chamber 273 within a sealed container 272. In this configuration, the flywheel 271 has an upper 280 and a lower 281 inductor alternator on opposite sides of a low permeability hub 275. As shown, the upper and lower inductor alternators have different constructions to illustrate different possibilities, although in an actual installation both upper and lower inductor alternators would normally be the same construction.

The rim 271 is attached to a central shaft 274 by way of the hub 275. The shaft 274 has upper and lower bearing stub shafts 277 and 276. Mechanical bearings 278 and 279, which are mounted in the upper and lower yokes 290 and 289, connect with the bearing shafts 277, 276 to support the flywheel 271. The upper inductor alternator 280 shows a very simple construction, but one having higher losses. The flux from the upper field coil 292 travels through the inner part of the upper yoke 290 and enters the upper axial end of the central shaft 274. It passes through the shaft 274 and exits radially outward from the outer diameter of the shaft 274. The flux travels through an inner airgap 282, through the armature coils 286, through a second air gap 283 and into the bore of the rim 271. The inside of the rim 271 contains intruding poles 284. The flux then travels through the rim 271 and across an upper axial air gap 293 into the stator yoke 290. Because the central cylinder or shaft 274 rotates with the rim 271, the flux intensity in those parts does not vary significantly with time, so losses are low. The annular flux pattern in the airgap containing the stationary armature coils 286 has alternating high intensity and low intensity bands coinciding with the poles 284 which rotate with the shaft 274 and the rim 271. The stationary armature coils 286 see large changes of flux intensity as the shaft and rim rotate, but the flux in the shaft 274 and rim 271 does change significantly with time, so the losses due to eddy currents are low.

The bottom inductor alternator uses a laminated construction to obtain the highest efficiency. A laminated annular center cylinder 295 is connected to the center shaft 274 and a laminated rotor liner 288 is attached to the bore of the rim 271. The armature coils 286 are in the air gap radially between the center cylinder 295 and the rotor liner 288 using supports 287. The laminated rotor liner 288 has internal poles 285. Flux is generated from the lower field coil 291 and travels axially into the end of the center shaft 274. The flux returns to the lower yoke 289 through the lower rotor axial air gap 294. The upper and lower yokes 290, 289 are preferably magnetically insulated from each other.

Another configuration of the invention can be constructed in which the flywheel is not hollow throughout its axial length and the field does not travel through an external yoke. An inductor alternator flywheel system illustrating these aspects of the invention is shown in FIG. 18. This configuration has the benefits of making a compact system and also minimizing manufacturing and assembly costs. The flywheel system 330 is comprised of a steel flywheel 331 that rotates inside an evacuated chamber 333 within a sealed container 332. The flywheel 331 has an integral center shaft 335, however it is possible to also construct the shaft and the center region of the flywheel separately and assemble them together. The shaft 335 is supported for rotation on upper and lower beatings 338 and 336. The bearings 338, 336 are supported using upper and lower bearing mounts 339 and 337. The top bearing mount 339 is preferably made including a low magnetic permeability material so it prevents shorting of the field flux in the container 332, if the container 332 is constructed from steel. The inductor alternator 340 has a stationary central stator cylinder 350 made with laminated construction. Because the center shaft 335 rotates, an inner radial air gap 342 is provided. Armature coils 345 are attached to the outer diameter of the stator cylinder 350. The flywheel 331 is provided with a laminated rotor liner 343, having internal poles 344, like those shown in FIGS. 9 or 11. An outer radial air gap 341 is created between the armature coils 351 and the rotor poles 344. A single field coil 346 attached to the stator cylinder 350 provides flux for operation. In this configuration, the flywheel system 330 is made more compact by not having an external stator yoke. Instead, the flux travels from the rim portion of the flywheel 331 to the center shaft 335 by traveling through the flywheel itself. Armature and field coil wires 347 exit the container 332 through electrical feedthroughs 348 and connect to external cabling 349.

Another embodiment shown in FIG. 19, is a flywheel energy storage and recovery system 360 having an annular flywheel rim 361 rotating in a container 362 with an evacuated internal chamber 363. An inductor alternator 364 is positioned compactly within the bore of the flywheel rime 361. The rim 361 is mounted for rotation by way of lower and upper hubs 365, 366 on lower and upper bearings 367 and 368 on a central shaft 369. The inductor alternator 364 has a laminated rotor 370 press fit into the bore of the annular flywheel rim 361 and a laminated stator core 371 attached to the central shaft 369. A plurality of armature coils 372, oriented with their axes facing radially, are mounted on the radial outer face of the stator core 371 in an annular coil can 373 of non-magnetic and preferably electrically non-conducting material such as ceramic or polycarbonate. Coolant is circulated through the can 373 by pump (not shown) through upper and lower tubes 374 (only one of which is shown) or by passive convective circulation. A field coil 376 produces magnetic flux which links the armature coils 372 in a magnetic circuit including a yoke 377, the laminated rotor 370, the laminated stator core 374 and the central shaft 369. The flywheel rim 361 is not necessarily in the flux path. The lead wires from the armature coils exit the can 373 through fluid tight pass-throughs 375 and are routed through radial holes in the central shaft to a central bore 380 and thence out of the container 362 through a vacuum-tight pass-through 382 to external cabling 383. The leads for the field coil are routed through similar openings to external controls shown in FIG. 17 outside the container 362. The flywheel rim 361 is preferably made of high strength steel although a composite rim could be used since the rim is not needed to complete the magnetic circuit for the field coil flux. If made of steel, the flywheel rim could be a component of magnetic bearings 378 using permanent magnets 379 to levitate the flywheel or to relieve the bearings 367 and 367 of all but a small portion of the anal load. The laminated rotor has poles or teeth 391, like those shown in FIGS. 9 and 11, that produce a time-varying flux through the armature coils 372 to generate a voltage in the coils that powers the load to be protected by the flywheel system, as explained in more detail in conjunction with FIG. 17 below.

The inductor alternator flywheel system is used for preventing interruptions of power to an output load. It functions as an uninterruptible power supply with the flywheel system doing the functions normally done by electrochemical batteries. A circuit diagram of an interruptible power source in accordance with the invention is shown in FIG. 17. The uninterruptible power source 300 is connected to a primary power source 301, which is typically AC utility power. The power source 300 then supplies output power 312 to a critical load, not shown. In applications where protection is to be provider for against extended interruptions, an auxiliary power source 304, such as a generator, can be included.

The auxiliary power source 304 is connected through use of a transfer switch 302 when the primary power source 310 fails for an extended period. The AC primary power 310 is rectified to a DC Buss 305 through use of a rectifier 303. The DC Buss power 305 is then inverted back to the AC output power 312 through use of an inverter 311. If the output power required were DC, the inverter 311 could be omitted. During an interruption of primary power 301 and prior to availability of auxiliary power 304 if included, the inductor alternator flywheel 307 provides power. When primary power is operative, the flywheel is accelerated to its normal operating speed. Acceleration and maintaining of speed is done achieved by using a synchronous inverter 306 that provides synchronous power to the armature coils 308 to provide acceleration. The inverter 306 preferably controls power to the armature coils 308 such as current limiting and control of the speed. One method to control power is through use of pulse width modulation. It is also conceivable that the power to the armature coils 308 could be applied as pulsed DC for providing acceleration since the rotor in the inductor alternator flywheel system is made to be homopolar. This would have the advantage of simplifying the synchronous motor drive 306. Because of the high efficiency of the invention, it is desirable to operate the inductor alternator 307 with fully energized field coils 309. During an interruption of primary power 301, the field is already fully established. Power is thus instantly and automatically supplied to the DC Buss and output power 312. Power immediately flows from the armature coils 308 through rectifier 310 to the DC Buss 305. No monitoring of the primary power 301 is required and no interruption in power from the inductor alternator 307 or in the output power 312 occurs. The rectifier 310 can be separate as shown or it can be combined in the inverter or motor drive 306. As the flywheel speed decreases, a field controller 313 increases power to the field coils 309. A preferred way to control the field power is from feedback using the flywheel speed 314. Other ways such as monitoring the output power 312 or DC Buss power 305 could alternatively be done. A majority of the flywheel energy is preferably extracted to support the output 312. During that period of discharge, either primary power 301 is restored or the auxiliary power source 304 is transferred on to supply power. The auxiliary power source 304 is preferably kept running until both the primary power source 310 is restored and the inductor alternator flywheel 307 is recharged. Although the invention could conceivably be operated with a reduced field coil power when primary power is functioning, this would create an interruption in power that is sought to be eliminated. The higher efficiency of the invention enables its operation preventing all interruptions of power and also to potentially operate with high speed and energy storage capability.

Obviously, numerous modifications and variations of the preferred embodiment described above are possible and will become apparent to those slilled in the art in light of this specification. For example, many functions and advantages are described for the preferred embodiment, but in some uses of the invention, not all of these functions and advantages would be needed. Therefore, I contemplate the use of the invention using fewer than the complete set of noted functions and advantages. Moreover, several species and embodiments of the invention are disclosed herein, but not all are specifically claimed, although all are covered by generic claim. Nevertheless, it is my intention that each and every one of these species and embodiments, and the equivalents thereof be encompassed and protected within the scope of the following claims, and no dedication to the public is intended by virtue of the lack of claims specific to any individual species. Accordingly, it is expressly intended that all these embodiments, species, modifications and variations, and the equivalents thereof are to be considered within the spirit and scope of the invention as defined in the following claim, wherein I claim:

What is claimed is:

1. An inductor alternator flywheel system comprising:
    a rotatable member mounted on bearings for rotation about an axis, said member including a flywheel rotor with a hollow center and an inwardly facing radial surface forming a plurality of protrusions extending radially inwardly, said radial protrusions being circumferentially spaced apart with spaces between said protrusions free of magnetic material;
    a non-rotating member having a source of homopolar flux, said flux creating magnetic poles in said protrusions;
    at least one cylinder having an outer radial surface, said cylinder being mounted concentric with respect to said rotor and spaced apart radially from said protrusions such that an armature air gap is formed between said protrusions and said outer surface, said cylinder being constructed of substantially high permeability material; and
    at least one armature coil mounted in an air-core armature within said air gap such that said flux induces an alternating voltage in said armature coil when said rotor rotates about said axis.

2. An inductor alternator flywheel system as described in claim 1 wherein:
    said flywheel rotor is constructed of steel.

3. An inductor alternator flywheel system as described in claim 1 wherein:
    said flywheel rotor is a hollow cylinder.

4. An inductor alternator flywheel system as described in claim 1 wherein:
    said inwardly extending protrusions are formed in a liner that is radially inside said hollow portion of said flywheel rotor.

5. An inductor alternator flywheel system as described in claim 4 wherein:
    said liner is interference assembled inside said hollow portion of said flywheel rotor.

6. An inductor alternator flywheel system as described in claim 4 wherein:
    said liner is constructed from multiple axial layers that reduce eddy currents in said protrusions.

7. An inductor alternator flywheel system as described in claim 6 wherein:
    said liner is comprised of laminations.

8. An inductor alternator flywheel system as described in claim 6 wherein:
    said liner has a lower maximum hoop direction stress than said flywheel rotor hollow portion when said flywheel rotor is rotating at normal operating speed.

9. An inductor alternator flywheel system as described in claim 1 wherein:
    said flywheel is connected to at least one hub having a smaller inner diameter, said inductor alternator flywheel further including a pair of upper and lower mechanical bearings for providing rotational support of said rotor, and an electromagnet mounted with respect to said flywheel rotor such that said electromagnet, when energized, lifts a majority of the weight of said flywheel rotor from said mechanical bearings.

10. An inductor alternator flywheel system as described in claim 9 wherein:
said electromagnet acts directly on said flywheel rotor to remove a majority of the weight of said flywheel rotor from said mechanical bearings.

11. An inductor alternator flywheel system as described in claim 1 wherein:
said source of homopolar flux comprises at least one field coil that induces said flux to flow.

12. An inductor alternator flywheel system as described in claim 11, further comprising:
a stationary yoke made of material having low magnetic reluctance, said yoke having an outer radial portion, an inner radial portion, and an intermediate portion between said outer radial portion and said inner radial portion;
said intermediate portion of said yoke having surfaces that are closely coupled magnetically with said field coil;
said outer radial portion of said yoke having a pole with axially facing surfaces closely spaced from said flywheel;
said inner radial portion of said yoke having surfaces that are operatively closely linked magnetically with said cylinder;
whereby said yoke, said flywheel, and said cylinder form a low reluctance magnetic circuit with said airgap between said flywheel and said cylinder, and said field coil drives flux through said magnetic circuit.

13. An inductor alternator flywheel system as described in claim 1 wherein:
said cylinder is constructed of multiple axial layers that reduce eddy currents in outer surface of said cylinder.

14. An inductor alternator flywheel system as described in claim 13 wherein:
said cylinder is comprised of laminations.

15. An inductor alternator flywheel system as described in claim 14 wherein:
said laminations have a central hole and the inner diameter of said laminations is connected to a central shaft.

16. An inductor alternator flywheel system as described in claim 14 wherein:
said central shaft is constructed of substantially high permeability material.

17. An inductor alternator flywheel system, comprising:
a rotatable member mounted on bearings for rotation about an axis, said member including a flywheel rotor constructed of steel with a hollow center and an inwardly facing radial surface forming a plurality of protrusions extending radially inwardly, said radial protrusions being circumferentially spaced apart;
said flywheel rotor has a central hole having a bore surface to which a hub portion is connected for mounting said flywheel to a central portion containing a bearing for journaling said flywheel rotor;
said hub portion is constructed such that it provides a high reluctance magnetic path between said flywheel rotor and said center portion;
a non-rotating member having a source of homopolar flux, said flux creating magnetic poles in said protrusions;
at least one cylinder having an outer radial surface, said cylinder being mounted concentric with respect to said rotor and spaced apart radially from said protrusions such that an armature air gap is formed between said protrusions and said outer surface, said cylinder being constructed of substantially high permeability material; and
at least one armature coil mounted within said air gap such that said flux induces an alternating voltage in said armature coil when said rotor rotates about said axis.

18. An inductor alternator flywheel system as described in claim 17 wherein:
said hub portion is constructed from a non-ferromagnetic material.

19. An apparatus for providing emergency power in the event of disruption in power from a primary power source coupled to an output, said apparatus comprising:
a rotatable mass that stores kinetic energy;
a brushless generator having a pair output leads, said leads being coupled to said output, and at least one field coil, said generator being coupled to said rotatable mass such that kinetic energy from said mass is converted to electrical energy and delivered to said leads when said field coil is energized;
said field coil being sufficiently energized when said primary power source is operational such that loss of said power does not require a rapid increase in power to said field coil to prevent a period of disruption in output power; and
a monitoring system that monitors the rotational speed and automatically increases the drive signal to said field coil to maintain a substantially constant output voltage at said output as said generator speed decreases.

20. An apparatus as described in claim 19 wherein:
said generator is an inductor alternator with both rotor and stator comprising laminated constructions.

21. An apparatus for providing emergency power in the event of disruption in power from a primary power source coupled to an output, said apparatus comprising:
a rotatable mass that stores kinetic energy;
a brushless motor/generator having a pair output leads, said leads being coupled to said output, and at least one field coil, said motor/generator being coupled to said rotatable mass such that kinetic energy from said mass is converted to electrical energy and delivered to said leads when said field coil is energized; and
said brushless motor/generator also having multiphase armature coils from which said motor/generator is accelerated to normal operating speed by supply of AC power to said multiphase armature coils and is kept from accelerating above normal operating speed by reducing said AC power to said armature coils;
a field control mechanism increases power to said field coil to maintain a substantially constant voltage as the speed of said generator decreases;
a field controller that provides sufficient power to said field coil such that said output voltage does not drop appreciably during an interruption of said primary power without reduction in rotational speed of said motor/generator, and said field control mechanism further increases power to said field coil to maintain a substantially constant output voltage at said output as said generator speed decreases.

22. An apparatus as described in claim 21 wherein:
the rotor portion of said motor/generator comprises multiple axial layer construction to reduce internal eddy current generation.

23. A apparatus for converting between electrical and kinetic energy comprising:

a flywheel rotor comprising a hollow cylinder and a liner with intrusions extending therefrom and forming a radial air gap, said intrusions being constructed of ferromagnetic material;

a member that generates homopolar flux, said intrusions and said flux generating member forming a magnetic circuit having a total reluctance that remains substantially constant while said rotor is rotated about an axis; and at least one stationary airgap armature coil mounted within said radial airgap with the active portion of said armature coil extends to substantially the entire axial length of said intrusions such that flux induces an AC voltage in said at least one armature coil when said rotor is rotated about said axis.

24. An apparatus as described in claim 23 wherein:

said hollow cylinder is comprised of an alloy steel having been quenched and tempered to a tensile yield strength greater than 100 ksi and a fracture toughness greater than 70 ksi(in)^½.

25. An apparatus as described in claim 24 wherein:

said hollow cylinder is constructed as a seamless ring by rolled ring forging.

26. An apparatus as described in claim 23 wherein:

said liner is constructed from multiple pieces around its circumference.

27. An inductor alternator flywheel system comprising:

a rotatable member that may be rotated about an axis, said member including a steel flywheel rotor having a plurality of poles;

a non-rotating member that generates homopolar flux, said flux magnetizing said poles;

a stator having an air gap facing surface, said stator being mounted concentric with respect to said rotor such that an armature air gap is formed between said poles and said air gap facing surface, said stator being constructed of substantially high permeability material; and at least one armature coil mounted within said air gap such that said flux induces an AC voltage in said at least one armature coil when said rotated about said axis;

said flywheel rotor being supported for rotation about a substantially vertical axis by a full levitation magnetic bearing system comprising at least one axial magnetic bearing carrying the axial weight and at least two radial magnetic bearings providing radial support.

28. An inductor alternator flywheel system as described in claim 27 wherein:

said non-rotating member generating homopolar flux contains at least two field coils that generate flux across an upper and a lower axial air gap to said flywheel rotor;

a position sensor determines the axial position of said rotor with respect to said non-rotating member;

power to said field coils are actively controlled using information from said position sensor to form said axial magnetic bearing.

29. An inductor alternator as described in claim 28 wherein:

increasing power to both coils increases the voltage induced in said armature coils, and increasing power to one field coil with respect to the other moves the flywheel vertically in one direction.

30. An inductor alternator flywheel system comprising:

a rotatable member mounted for rotation about an axis, said member including a steel flywheel rotor with a hollow portion having a laminated liner with a plurality of intrusions extending therefrom to a minimum radius;

a non-rotating member that generates flux, said flux creating magnetic poles in said intrusions;

at least one cylinder having an outer surface comprised of laminations, said cylinder being mounted concentric with respect to said rotor such that an armature air gap is formed between said intrusions and said outer surface, said cylinder being constructed of substantially high permeability material; and at least one armature coil mounted within said air gap such that said flux induces an AC voltage in said at least one armature coil when said rotated about said axis.

31. An inductor alternator for a flywheel energy storage and retrieval system comprising:

a rotatable member that may be rotated about an axis, said rotatable member including a steel flywheel rotor with a hollow portion having a plurality of intrusions extending radially inwardly therefrom to a minimum radius;

a non-rotating member that generates homopolar flux, said flux creating magnetic poles in said intrusions;

a cylinder having an outer surface, said cylinder being mounted such that it rotates with said rotor such that an armature air gap is formed between said intrusions and said outer surface, said cylinder being constructed of substantially high permeability material; and at least one armature coil mounted within said air gap such that said flux induces an AC voltage in said at least one armature coil when said rotated about said axis.

32. An inductor alternator flywheel system as described in claim 31 wherein:

said cylinder is attached to said rotor through the use of a high reluctance connection.

33. An inductor alternator flywheel system as described in claim 32 wherein:

said intrusions are constructed from multiple axial layers that minimize eddy currents in said intrusions.

34. An inductor alternator flywheel system comprising:

a rotatable member supported for rotation about a substantially vertical axis, said rotatable member including a flywheel rotor with a non-uniform surface such that variations in said surface form poles;

a non-rotating member having at least one field coil that generates homopolar flux, said flux traveling through said poles;

a stationary portion of said non-rotating member adjacent to and spaced apart from said poles for receiving said flux and defining an air gap between said stationary member and said poles;

at least one armature coil mounted within said air gap such that said flux induces an AC voltage in said armature coil when said rotor is rotated about said axis;

a full levitation magnetic bearing system for supporting said rotor for rotation about said vertical axis, said magnetic bearing system comprising an axial force generating magnetic bearing and upper and lower radial force generating magnetic bearings.

35. An inductor alternator flywheel system as described in claim 34 further comprising:

a position sensor for determining the axial position of said rotor to provide axial control; and a magnetic circuit links said homopolar flux from said field coil and provides a bias flux for the axial magnetic bearing.

36. An apparatus for providing emergency power in the event of disruption in power from a primary power source coupled to an output, said apparatus comprising:

a rotatable mass that stores kinetic energy;

a brushless generator having a pair output leads, said leads being coupled to said output, and at least one field coil, said generator being coupled to said rotatable mass such that kinetic energy from said mass is converted to electrical energy and delivered to said leads when field power is applied to said field coil; and a field controller that provides field power at a level to said field coil when said rotatable mass is rotating at normal full operating speed such that said generator provides full output power under full load to said output at the instant of disruption in primary power, and said field controller increases said field power during a continuous disruption of primary power to maintain a substantially constant output voltage at said output as said generator speed decreases.

37. An apparatus for providing emergency power in the event of disruption in power from a primary power source coupled to an output, said apparatus comprising:

a mass supported on bearings for rotation to store kinetic energy;

a brushless motor/generator having a pair output leads, said leads being coupled to said output, and at least one field coil, said motor/generator being coupled to said rotatable mass such that kinetic energy from said mass is converted to electrical energy and delivered to said leads when said field coil is energized; and said brushless motor/generator also having multiphase armature coils from which said motor/generator is accelerated to normal operating speed by supply of AC power to said multiphase armature coils and is kept from accelerating above normal operating speed by reducing said AC power to said armature coils;

said brushless motor/generator comprising laminated rotor and stator constructions providing high enough efficiency such that said field coil can be sufficiently energized such that the voltage generated by said armature coils remains substantially constant when primary power is disrupted;

a field control mechanism increases power to said field coil to maintain a substantially constant voltage as the speed of said generator decreases.

38. An inductor alternator flywheel system for converting between electrical and kinetic energy, said apparatus comprising:

an annular steel flywheel rotor with a hollow center bore and an attached internal liner inside said bore having inwardly extending radial protrusions and being constructed from multiple axial layers that reduce eddy current generation in said protrusions;

a source of homopolar flux that generates homopolar flux in a magnetic circuit that includes said flywheel rotor and at least one stationary armature coil mounted such that said flux induces an AC voltage in said armature coil when said rotor is rotated about an axis.

* * * * *